(12) United States Patent
Billi et al.

(10) Patent No.: US 10,796,156 B2
(45) Date of Patent: Oct. 6, 2020

(54) ANALYZING VIDEO STREAMS IN AN INDUSTRIAL ENVIRONMENT TO IDENTIFY POTENTIAL PROBLEMS AND SELECT RECIPIENTS FOR A DISPLAY OF VIDEO STREAMS RELATED TO THE POTENTIAL PROBLEMS

(71) Applicant: Rockwell Automation Technologies, Inc., Mayfield Heights, OH (US)

(72) Inventors: Sharon M. Billi, Euclid, OH (US); Christopher Wayne Como, Chagrin Falls, OH (US); Edward A. Gray, Olmsted Township, OH (US); Kyle Reissner, Hudson, OH (US); Jonathan D. Walter, Broadview Heights, OH (US); Mohit Singhai, Lyndhurst, OH (US); Douglas J. Reichard, Fairview Park, OH (US); Scott N. Sandler, Chagrin Falls, OH (US); Ronald E. Bliss, Twinsburg, OH (US); Michael John Pantaleano, Willoughby, OH (US); Ryan Cahalane, Chagrin Falls, OH (US); Jessica L. Korpela, Milwaukee, WI (US); Bruce T. McCleave, Mission Viejo, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/403,770

(22) Filed: May 6, 2019

(65) Prior Publication Data
US 2019/0258863 A1 Aug. 22, 2019

Related U.S. Application Data

(63) Continuation of application No. 15/132,376, filed on Apr. 19, 2016, now Pat. No. 10,325,155.

(51) Int. Cl.
*H04N 7/18* (2006.01)
*G06K 9/00* (2006.01)
(Continued)

(52) U.S. Cl.
CPC ..... *G06K 9/00718* (2013.01); *G06K 9/00771* (2013.01); *G06K 9/6269* (2013.01);
(Continued)

(58) Field of Classification Search
USPC ........................................................ 348/86
See application file for complete search history.

(56) References Cited

U.S. PATENT DOCUMENTS 5,909,548 A 6/1999 Klein et al.
6,006,171 A 12/1999 Vines et al.
(Continued)

FOREIGN PATENT DOCUMENTS

| CN | 101963799 A | 2/2011 |
|---|---|---|
| CN | 103578039 A | 2/2014 |
| EP | 3018597 A1 | 5/2016 |

OTHER PUBLICATIONS

Non-Final Office Action received for U.S. Appl. No. 15/672,851 dated Oct. 29, 2019, 57 pages.
(Continued)

*Primary Examiner* — Behrooz M Senfi
(74) *Attorney, Agent, or Firm* — Amin, Turocy & Watson, LLP

(57) ABSTRACT

The subject matter disclosed herein relates generally to industrial automation systems, and, more particularly, to collecting video streams from a variety of video devices in an industrial environment, identifying and analyzing potential problems in the industrial environment using the video streams, and presenting the video streams and data associated with the potential problem to appropriate recipients.

20 Claims, 16 Drawing Sheets

(51) Int. Cl.
*G06K 9/62* (2006.01)
*H04N 5/765* (2006.01)

(52) U.S. Cl.
CPC ............. *H04N 5/765* (2013.01); *H04N 7/181* (2013.01); *G06K 2209/19* (2013.01)

(56) References Cited

U.S. PATENT DOCUMENTS

| | | | |
|---|---|---|---|
| 6,618,856 | B2 | 9/2003 | Coburn et al. |
| 7,117,043 | B1 | 10/2006 | Frederick et al. |
| 8,285,744 | B2 | 10/2012 | Dorgelo et al. |
| 8,438,192 | B2 | 5/2013 | Obitko et al. |
| 9,110,972 | B2 | 8/2015 | Hamdi et al. |
| 2002/0087419 | A1 | 7/2002 | Andersson et al. |
| 2003/0079224 | A1 | 4/2003 | Komar et al. |
| 2004/0236620 | A1 | 11/2004 | Chauhan et al. |
| 2006/0177119 | A1* | 8/2006 | McPheely ........... G05B 19/4184 382/141 |
| 2007/0078824 | A1 | 4/2007 | Dorgelo et al. |
| 2007/0251988 | A1 | 11/2007 | Ahsan et al. |
| 2008/0016146 | A1 | 1/2008 | Gan et al. |
| 2008/0082577 | A1 | 4/2008 | Hood et al. |
| 2008/0208368 | A1 | 8/2008 | Grgic |
| 2008/0288321 | A1 | 11/2008 | Dillon et al. |
| 2008/0307523 | A1 | 12/2008 | Subramanyam et al. |
| 2009/0077055 | A1 | 3/2009 | Dillon et al. |
| 2009/0083649 | A1 | 3/2009 | Baier et al. |
| 2009/0086021 | A1 | 4/2009 | Baier et al. |
| 2009/0327483 | A1 | 12/2009 | Thompson et al. |
| 2010/0049574 | A1 | 2/2010 | Paul et al. |
| 2010/0082669 | A1 | 4/2010 | Obitko et al. |
| 2010/0161835 | A1 | 6/2010 | Syed et al. |
| 2010/0191487 | A1 | 7/2010 | Rada et al. |
| 2010/0256795 | A1 | 10/2010 | McLaughlin et al. |
| 2011/0022198 | A1 | 1/2011 | Plache et al. |
| 2011/0150431 | A1 | 6/2011 | Klappert |
| 2011/0261186 | A1 | 10/2011 | Blackburn et al. |
| 2012/0112893 | A1 | 5/2012 | Bezdicek et al. |
| 2012/0194502 | A1 | 8/2012 | Smith et al. |
| 2012/0240049 | A1 | 9/2012 | Britt et al. |
| 2012/0242648 | A1 | 9/2012 | Baier et al. |
| 2013/0006395 | A1 | 1/2013 | Plache et al. |
| 2013/0123965 | A1 | 5/2013 | Cooper et al. |
| 2013/0124186 | A1 | 5/2013 | Donabedian et al. |
| 2013/0124253 | A1 | 5/2013 | Cooper et al. |
| 2013/0124465 | A1 | 5/2013 | Pingel et al. |
| 2013/0211559 | A1 | 8/2013 | Lawson et al. |
| 2013/0212160 | A1 | 8/2013 | Lawson et al. |
| 2013/0212420 | A1 | 8/2013 | Lawson et al. |
| 2013/0290374 | A1 | 10/2013 | Chand et al. |
| 2013/0297060 | A1 | 11/2013 | Sundling, Jr. et al. |
| 2013/0325541 | A1 | 12/2013 | Capriotti et al. |
| 2014/0019461 | A1 | 1/2014 | Bredenberg et al. |
| 2014/0277593 | A1 | 9/2014 | Nixon et al. |
| 2014/0316540 | A1 | 10/2014 | Loncar et al. |
| 2014/0336791 | A1 | 11/2014 | Asenjo et al. |
| 2014/0358601 | A1* | 12/2014 | Smiley ............... G06Q 10/0635 705/7.11 |
| 2015/0116482 | A1* | 4/2015 | Bronmark .......... H04N 5/23216 348/129 |
| 2015/0213838 | A1* | 7/2015 | Dinev ................. G11B 27/105 386/224 |
| 2015/0293530 | A1 | 10/2015 | Haskell et al. |
| 2015/0316904 | A1 | 11/2015 | Govindaraj et al. |
| 2016/0127712 | A1 | 5/2016 | Alfredsson et al. |
| 2016/0132538 | A1 | 5/2016 | Bliss et al. |
| 2016/0274558 | A1 | 9/2016 | Strohmenger et al. |
| 2016/0282872 | A1 | 9/2016 | Ahmed et al. |
| 2016/0292895 | A1 | 10/2016 | Billi et al. |
| 2017/0085084 | A1 | 3/2017 | Daly |
| 2017/0351226 | A1 | 12/2017 | Bliss et al. |
| 2018/0300437 | A1 | 10/2018 | Thomsen et al. |
| 2018/0357334 | A1 | 12/2018 | Chao et al. |

OTHER PUBLICATIONS

Office Action for U.S. Appl. No. 14/536,504 dated Nov. 3, 2017, 40 pages.
Office Action for U.S. Appl. No. 15/132,376 dated Dec. 11, 2017, 46 pages.
Third Office Action received for Chinese Patent Application Serial No. 201510757657.7 dated Oct. 24, 2018, 7 pages (including English Translation).
First Office Action received for Chinese Application Serial No. 201510756437.2 dated Jul. 3, 2018, 29 pages (Including English Translation).
First Office Action received for Chinese Application Serial No. 201510757657.7 dated Nov. 1, 2017, 20 pages.
Communication pursuant to Rule 94 EPC for EP Patent Application Serial No. 15193678.8 dated Apr. 13, 2018, 8 pages.
Final Office Action received for U.S. Appl. No. 14/536,504 dated Apr. 24, 2018, 48 pages.
Final Office Action received for U.S. Appl. No. 15/132,376 dated May 21, 2018, 32 pages.
Search Report received for Chinese Application Serial No. 2015107564372 dated Jun. 25, 2018, 2 pages.
Communication pursuant to Article 94(3) EPC for European Application Serial No. 15193628.3 dated May 7, 2018, 12 pages.
Office Action for U.S. Appl. No. 15/132,376 dated Sep. 5, 2018, 41 pages.
Marshall, et al. "In Search of More Meaningful Search", Serials Review, Sep. 2006, JAI, Amsterdam, NL—ISSN 0098-7913, vol. 32, Nr:3, pp. 172-180.
Extended European Search Report for European Application No. 15193628.3 dated Mar. 24, 2016, 9 pages.
Extended European Search Report for European Application No. 15193678.8 dated Mar. 24, 2016, 10 pages.
European Office Action for European Application Serial No. 15193628.3 dated May 17, 2016, 2 pages.
European Office Action for European Application Serial No. 15193678.8 dated May 17, 2016, 2 pages.
Office Action for U.S. Appl. No. 14/536,490 dated Nov. 1, 2016, 39 pages.
Office Action for U.S. Appl. No. 14/536,504 dated Nov. 30, 2016, 33 pages.
Final Office Action for U.S. Appl. No. 14/536,490 dated Mar. 15, 2017, 44 pages.
Notice of Allowance for U.S. Appl. No. 14/536,490 dated May 12, 2017, 22 pages.
Final Office Action for U.S. Appl. No. 14/536,504 dated Jul. 13, 2017, 63 pages.
Notice of Allowance received for U.S. Appl. No. 15/672,851 dated Mar. 2, 2020, 36 pages.
Non-Final Office Action received for U.S. Appl. No. 16/247,021 dated May 29, 2020, 57 pages.
Extended European Search Report for European Application No. 20151378.5 dated Jun. 8, 2020, 10 pages.

* cited by examiner

ANALYZING VIDEO STREAMS IN AN INDUSTRIAL ENVIRONMENT TO IDENTIFY POTENTIAL PROBLEMS AND SELECT RECIPIENTS FOR A DISPLAY OF VIDEO STREAMS RELATED TO THE POTENTIAL PROBLEMS

CROSS REFERENCE TO RELATED APPLICATIONS

This application is a continuation of, and claims priority to U.S. patent application Ser. No. 15/132,376, filed on Apr. 19, 2016, entitled "ANALYZING VIDEO STREAMS IN AN INDUSTRIAL ENVIRONMENT TO IDENTIFY POTENTIAL PROBLEMS AND SELECT RECIPIENTS FOR A DISPLAY OF VIDEO STREAMS RELATED TO THE POTENTIAL PROBLEMS", and now issued as U.S. Pat. No. 10,325,155. The entirety of the aforementioned application is hereby incorporated herein by reference.

BACKGROUND

Conventionally, in industrial environments, potential problems with machines and processes are determined based upon I/O data associated with industrial controllers. This generally limits the available data for identifying and analyzing potential problems to that which is produced or collected by the industrial controllers as part of an industrial control process.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system is provided comprising a video receiving component configured to obtain video streams captured by cameras in an industrial environment, a video monitoring component configured to identify a potential problem in the industrial environment based on a video stream of the video streams, and a video presentation component configured to present a display comprising the video stream to a display device associated with a selected recipient.

In one or more embodiments, a method is provided comprising receiving, by a system comprising a processor, video streams captured by cameras in an industrial environment, determining, by the system, a potential problem in the industrial environment based on a video stream of the video streams, and streaming, by the system, a display comprising the video stream to a display device associated with a selected recipient.

In one or more embodiments, a non-transitory computer-readable medium having stored thereon instructions that, in response to execution, cause a system comprising a processor to perform operations, the operations comprising accessing video streams captured by cameras in an industrial environment, predicting a potential problem in the industrial environment based on at least one video stream of the video streams, and delivering, by the system, a display comprising the at least one video stream to a display device associated with a selected recipient.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
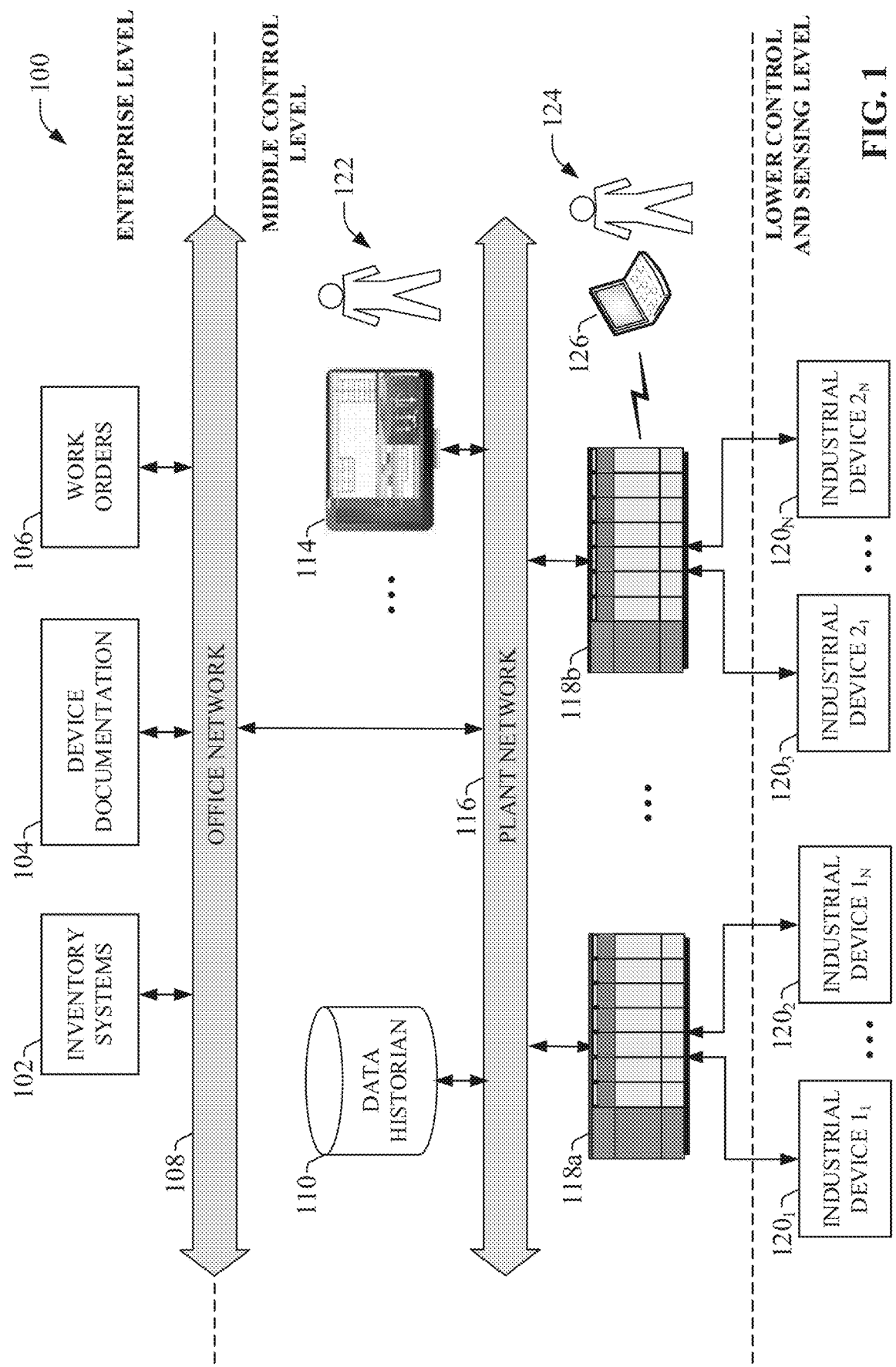
FIG. 1 illustrates a diagram of an exemplary non-limiting industrial control environment in accordance with an implementation of this disclosure.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Industrial controllers 118 and HMIs 114 comprise two sources of information relating to the industrial processes and systems being controlled within the plant environment. Since HMIs 114 leverage data from industrial controllers 118 (or read directly from controlled industrial devices or other I/O devices in some scenarios) to facilitate visualization of the controlled systems, both the industrial controllers 118 and the HMIs 114 may contain information relating a common aspect of the industrial systems. For example, the control programming (e.g., ladder logic, sequential function chart, etc.) for controlling operation of a particular tank used in a batch process may execute on one of the industrial controllers 118, while the operator interface screens for viewing a graphical representation of the tank's current status and relevant setpoints (e.g., level setponts, maximum flow setpoints, etc.) may be viewed on one of the HMIs 114. However, since these two sources of information are segregated cross two different data sources and platforms, operators and maintenance personnel are typically only able to view one source of information at a time. That is, operators may choose to view the operator interface screens for the tank of interest on the relevant HMI terminal (see operator 122), or may connect a personal computing device (e.g., a laptop or tablet computer) to the industrial controller to view the control programming used to control the tank's operation (see operator 124). In most cases, the operator must be in physical proximity to either the HMI terminal or the industrial controller in order to view the information on that particular data source. Consequently, during troubleshooting of maintenance issues involving the tank, personnel must travel to the source of the information (e.g., the HMI terminal or industrial controller, which are often located near the physical machine being controlled) and locally search each of the HMI and the industrial controller individually.

Some industrial environments may also include other sources of potentially relevant information relating to specific aspects of the controlled industrial systems. These may include, for example, a data historian 110 that aggregates and stores production information collected from the industrial controllers 118 or other data sources, or a device documentation store 104 containing electronic documentation for the various industrial devices making up the controlled industrial systems. Other information sources may include an inventory tracking system 102, a work order management system 106, repositories for machine or process drawings and documentation, vendor product documentation storage, vendor knowledgebases, internal knowledgebases, or other such systems, some or all of which may reside on an office network 108 of the industrial environment. These diverse information sources are spread across many locations and systems both within the plant environment and externally (e.g., on the Internet). When diagnosing problems, maintenance personnel are often required to search several of these sources of information individually, using several different software packages specific to the respective data sources being searched. Individually searching each of these data sources in connection with solving a system downtime issue or other problem can delay correction of maintenance issues, resulting in lost revenue and scheduling problems. Conventionally, the information employed to diagnose potential problems is I/O generated or collected by controllers executing an industrial control process.

To address these and other issues, one or more embodiments of the present disclosure provide a video distribution system that monitors video streams generated by cameras in the industrial environment along with other data generated in the industrial environment to identify potential problems (e.g. operational and/or maintenance issues) and present video streams associated with potential problems to appropriate personnel. It is to be appreciated that potential problem can refer to a problem that has occurred or is predicted to occur. The cameras can be, in a non-limited example, fixed mounted cameras (e.g. ceiling mounted, wall mounted, floor mounted, machine mounted, or any other suitable fixed mounted camera) or mobile cameras (e.g. computer, mobile phone, wearable device, drone, vehicle mounted, cart mounted, or any other suitable mobile camera). For example, an industrial environment, can have a variety of cameras mounted throughout the environment, as well as having cameras worn by personnel working in the industrial environment. Video distribution system can monitor the video streams being produced by the cameras to identify a potential problem in an industrial process, such as in a non-limiting example, a thermal image from a camera indicating that a machine is overheating, or an image showing the beginning of a backup of parts at a machine in the process, or an operator is not following a procedure. Video distribution system can examine data from the industrial process/environment that is time synchronized with the video streams to correlate data that is associated with the potential problem. Video distribution system can look back at the history of the video streams and/or data to identify instigators that influenced occurrence of the potential problem. For example, in the example of the beginning of the backup of parts in the section of the process, video distribution system can analyze video streams captured prior to the identification of the potential problem to identify an issue with an operator of the machine or another operator of another machine earlier in the process that is causing the backup to occur, and present video streams and/or data to appropriate personnel. In the example of an operator not following a procedure, video distribution system can learn normal operating procedures for a process from video streams over time and identify when an operator is deviating from the normal procedure. Video distribution system, for example, can present the video stream to a supervisor of the operator. Advantageously, this can allow for correcting the operator as the deviation is occurring versus waiting for the problem to be identified in a quality inspection process further down the line and having to troubleshoot where the problem occurred.

Figure 2:
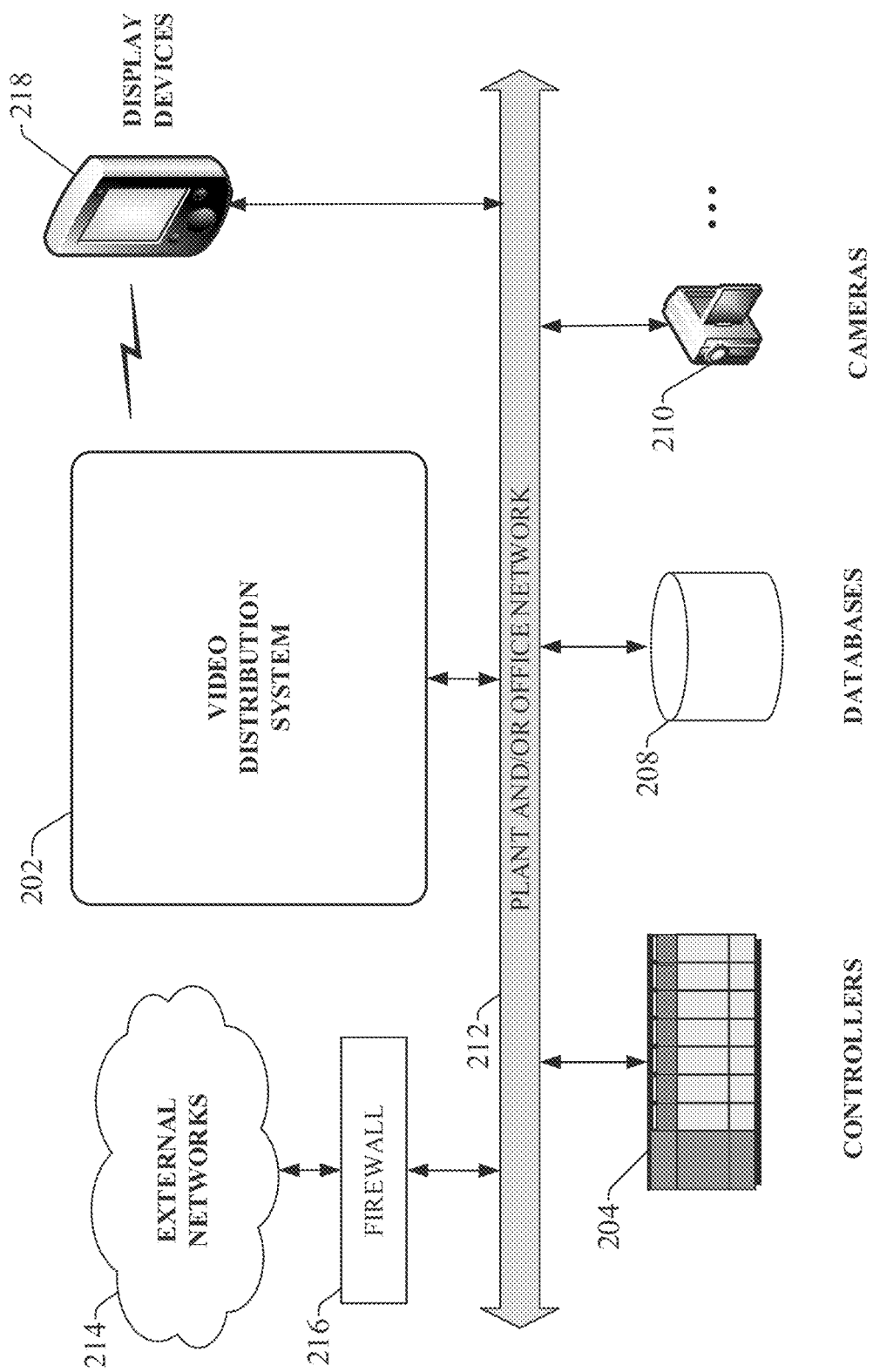
FIG. 2 illustrates an exemplary non-limiting block diagram of an architecture including a video distribution system in accordance with an implementation of this disclosure.

FIG. 2 is a block diagram of a generalized example architecture including a video distribution system 202 that analyzes video streams and data, and presents video streams and/or data associated with potential problems to recipients an industrial environment. The example industrial environment depicted in FIG. 3 includes video distribution system 202, one or more industrial controllers 204, databases 208 (e.g., data historians, employee databases, inventory databases, product inventory tracking systems, work order management system, manufacturing execution system, order management system, warehouse management system, or any other suitable data from systems in an industrial or office environment), cameras 210, and display devices 218 communicating wired and/or wirelessly on a plant and/or office network 212, and/or an external network 214. Network 212 may also have access to external networks 214 such as the Internet (e.g., via firewall 216).

Cameras 210 can be any suitable type of device for recording video streams, and interacting with, presenting, receiving, accessing, or supplying video streams locally, or remotely over a wired or wireless communication link, non-limiting examples of which include a wearable device or a non-wearable device. Display devices 218 can be any suitable type of device for recording, interacting with, presenting, receiving, accessing, or supplying video streams and/or data locally, or remotely over a wired or wireless communication link, non-limiting examples of which include a wearable device or a non-wearable device. Wearable device can include, for example, heads-up display glasses, a monocle, eyeglasses, contact lens, sunglasses, a headset, a visor, a cap, a helmet, a mask, a headband, clothing, camera, video camera, clip-on device, pocket device, strap-on device, attachable device, or any other suitable device capable of recording, interacting with, presenting, receiving, accessing, or supplying video streams and/or data that can be worn by a human or non-human user. Non-wearable device can include, for example, a mobile device, a mobile phone, a camera, a camcorder, a video camera, personal data assistant, laptop computer, tablet computer, desktop computer, HMI, server system, television set, monitor, media extender device, Blu-ray device, DVD (digital versatile disc or digital video disc) device, compact disc device, audio/video receiver, radio device, navigation system, sensor, or any other suitable device capable of recording, interacting with, presenting, receiving, accessing, or supplying video streams and/or data. Moreover, wearable device and/or a non-wearable device can include a user interface (e.g., a web browser or application), that can receive and present displays and data generated locally or remotely.

In some embodiments, video distribution system 202 may be implemented on a web server, allowing display device 218 to access video distribution system 202 via an Internet connection. Video distribution system 202 may also be implemented on a networked local server accessible by display device 218 via a wireless network connection. In yet another scenario, video distribution system 202 may be implemented on a cloud platform, where video distribution system 202 executes as a cloud-based service.

Figure 3:
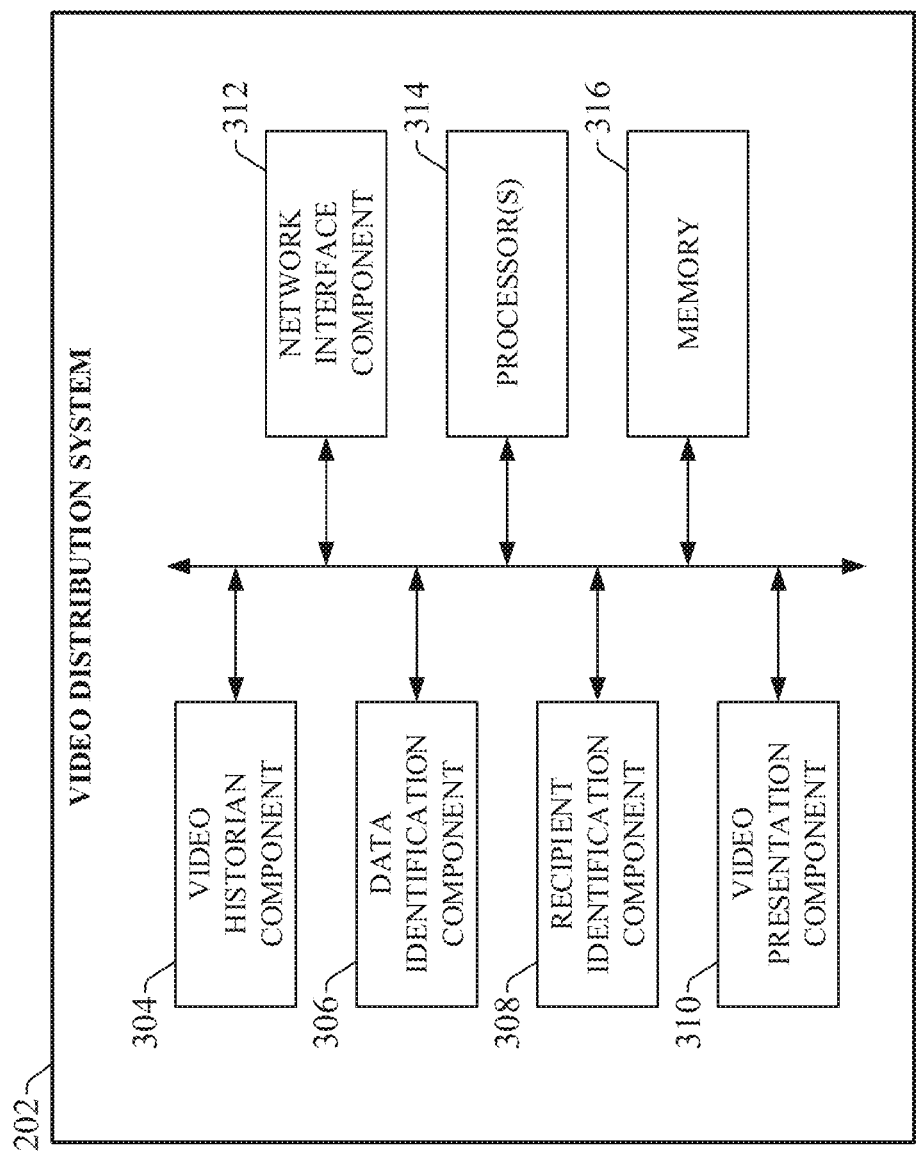
FIG. 3 illustrates an exemplary non-limiting block diagram of a video historian component in accordance with an implementation of this disclosure.

FIG. 3 is a block diagram of an example video distribution system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Video distribution system 202 can include a video historian component 304, a data identification component 306, a recipient identification component 308, a video presentation component 310, a network interface component 312, one or more processors 314, and memory 316. In various embodiments, one or more of the video historian component 304, data identification component 306, recipient identification component 308, video presentation component 310, network interface component 312, the one or more processors 314, and memory 316 can be electrically and/or communicatively coupled to one another to perform one or more of the functions of video distribution system 202. In some embodiments, components 304, 306, 308, 310, and 312 can comprise software instructions stored on memory 316 and executed by processor(s) 314. Video distribution system 202 may also interact with other hardware and/or software components not depicted in FIG. 3. For example, processor(s) 314 may interact with one or more external user interface devices, such as a keyboard, a mouse, a display monitor, a touchscreen, or other such interface devices.

Video historian component 304 can receive and/or obtain video streams produced by cameras 210 in an industrial environment. Video historian component 304 can also monitor the video streams to identify potential problems in the industrial environment and/or identify video streams associated with potential problems identified by data identification component 306. Data identification component 306 can monitor data produced in the industrial environment to identify potential problems and/or identify data produced in the industrial environment associated with potential problems identified by video historian component 304. Recipient identification component 308 determines recipients for presentation of video streams and/or data associated with potential problems. Video presentation component 310 presents video streams and/or data associated with potential problems to recipients on display devices 218.

The one or more processors 314 can perform one or more of the functions described herein with reference to the systems and/or methods disclosed. Memory 316 can be a computer-readable storage medium storing computer-executable instructions and/or information for performing the functions described herein with reference to the systems and/or methods disclosed.

Figure 4:
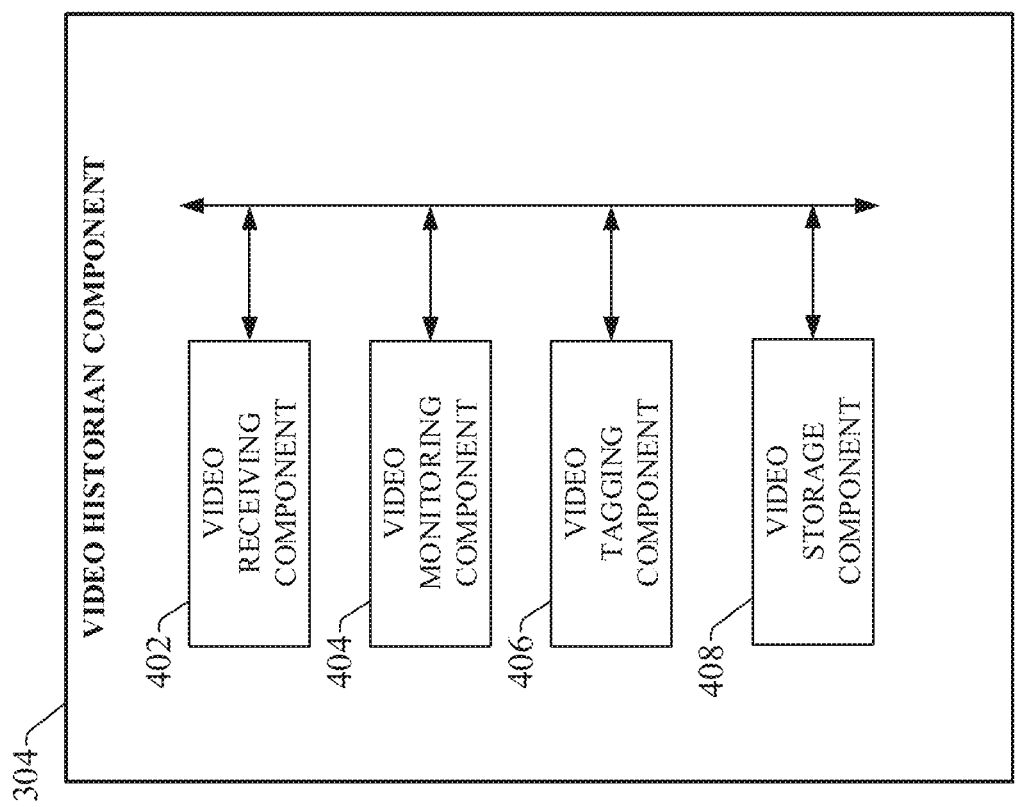
FIG. 4 illustrates an exemplary non-limiting block diagram of a video distribution system in accordance with an implementation of this disclosure.

FIG. 4 is a block diagram illustrating components of video historian component 304 in more detail. Video historian component 304 can include video receiving component 402 that receives and/or obtains video streams produced by cameras 210 in an industrial environment. For example, video receiving component 402 can receive live video streams from cameras 210. In another example, video receiving component 402 can obtain video streams produced by cameras 210 that are stored on cameras 210 or databases associated with cameras 210. It is to be appreciated that the video streams produced by cameras 210 can be time stamped, and time synchronized based upon a common time signal, or video receiving component 402 can synchronize the time stamps based upon respective time signals employed to generate the time stamps.

Figure 7:
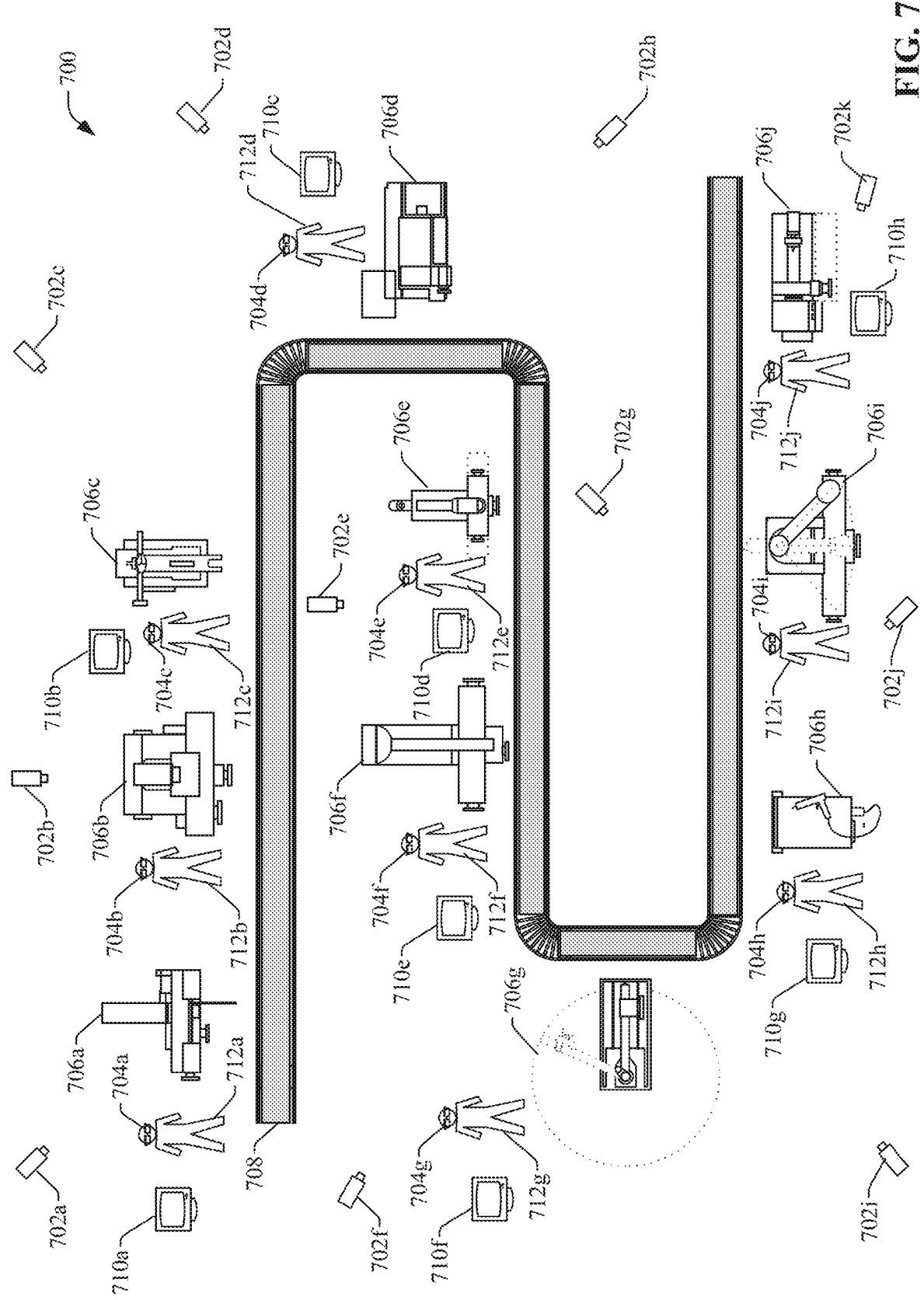
FIG. 7 illustrates a diagram of an exemplary non-limiting industrial control environment in accordance with an implementation of this disclosure.

Referring to FIG. 7, a non-limiting example industrial environment 700 is depicted showing a conveyor line 708 associated with an industrial process. The example industrial environment 700 depicts fixed mounted cameras 702a, 702b, 702c, 702d, 702e, 702f, 702g, 702h, 702i, 702j, and 702k. The example industrial environment 700 also depicts personnel 712a, 712b, 712c, 712d, 712e, 712f, 712g, 712h, 712i, and 712j with mobile wearable devices (e.g. glasses with built in display device and camera) 704a, 704b, 704c, 704d, 704e, 704f, 704g, 704h, 704i, and 704j. Industrial environment 700 also depicts machines 706a, 706b, 706c, 706d, 706e, 706f, 706g, 706h, 706i, and 706j used in the industrial process. The example industrial environment 700 also depicts display devices 710a, 710b, 710c, 710d, 710e, 710f, 710g, and 710h.

Video receiving component 402 can receive live and/or stored video streams from cameras 702a, 702b, 702c, 702d, 702e, 702f, 702g, 702h, 702i, 702j, 702k, 704a, 704b, 704c, 704d, 704e, 704f, 704g, 704h, 704i, and 704j.

Referring back to FIG. 4, video historian component 304 can also include video monitoring component 404 that monitors video streams produced by cameras 210 to identify potential problems in the industrial environment. In a non-limiting example, video monitoring component 404 can compare live video streams to stored video streams to determine a change to a state or operation of a machine, part, personnel, or environment associated with an industrial process detected in the live video stream that deviates from a normal state or operation of the machine, part, personnel, or environment learned from the stored video streams in conjunction with the industrial process. In another non-limiting example, video monitoring component 404 can identify an abnormal temperature change in a machine, part, personnel, or environment detected in a thermal video associated with the industrial process. In a further non-limiting example, video monitoring component 404 can identify a procedure performed by personnel associated with the industrial process in video stream that deviates from a normal procedure associated with the industrial process. In another non-limiting example, video monitoring component 404 can identify smoke, sparks, flames, fluid, metal shavings, or another material being produced by a machine that is not consistent with normal operation of the machine in a process. In a further non-limiting example, video monitoring component 404 can identify vibration, shaking, or movement of a machine that is not consistent with normal operation of the machine in a process. In another non-limiting example, video monitoring component 404 can identify personnel that are in an area associated with a machine or process that they should not or are not authorized to be located. Upon identification of a potential problem in a video stream, video monitoring component 404 can examine other video streams associated with activities in the industrial process that occurred concurrent and/or prior to a time of the potential problem in the video stream in order to identify possible instigators in the video streams that could have played a part in causing the potential problem. It is to be appreciated that for an ongoing problem, concurrent can also mean other live video streams.

It is to be appreciated that video monitoring component 404 can employ video recognition techniques, such as in a non-limiting example, object recognition, pattern recognition, shape recognition, texture recognition, facial recognition, motion recognition, activity recognition, pose recognition, context recognition, color recognition, optical character recognition, or any other suitable technique for video recognition, when analyzing video streams to identify potential problems. Video monitoring component 404 can also employ data (e.g. camera type, cameral location, camera specifications, camera settings, etc.) associated with cameras 210 that produced the video streams when analyzing video streams to identify potential problems.

Referring again to FIG. 7, video monitoring component 404 can monitor the received live and/or stored video streams from cameras 702a, 702b, 702c, 702d, 702e, 702f, 702g, 702h, 702i, 702j, 702k, 704a, 704b, 704c, 704d, 704e, 704f, 704g, 704h, 704i, and 704j to identify a potential problem. In a non-limiting example, video monitoring component 404 can compare a live video stream from camera 702a to a stored video stream from camera 702a to determine that personnel 712a has deviated from a normal operating procedure for machine 706a. In another non-limiting example, video monitoring component 404 can analyze a video stream from camera 702d to identify a potential problem with a part at machine 706d. In a further non-limiting example, video monitoring component 404 can analyze video streams from cameras 702a, 702b, 702c, 702e, 702f, 702g, 702h, 702i, 702j, 702k, 704a, 704b, 704c, 704d, 704e, 704f, 704g, 704h, 704i, and 704j concurrent and/or prior to a timestamp associated with the potential problem to identify potential instigators in video streams of the potential problem with the part at machine 706d. For example, video monitoring component 404 can identify a positioning of the part at an earlier step in the process in a video stream from camera 704b during processing at machine 706b as a potential instigator of the potential problem with the part at machine 706d.

Referring back to FIG. 4, video historian component 304 can also include video tagging component 406 that can tag respective portions of video streams associated with potential problems with respective unique identifiers associated with the potential problems. Video tagging component 406 can also tag respective potential instigators in the video streams associated with the potential problems with the respective unique identifiers associated with the potential problems. Video tagging component 406 can tag video streams, time ranges of the video streams, and portions of frames of video streams with the unique identifier associated with a potential problem. For example, video tagging component 406 can tag a time point or a time range of a video stream associated with the potential problem or associated potential instigator with the unique identifier associated with the potential problem. In another example, video tagging component 406 can tag a portion of a frame of a video with the unique identifier associated with a potential problem, such as a coordinate point or area of the frame associated with the potential problem or potential instigator. Tagging allows for easy retrieval and presentation of portions of related video streams with a potential problem and associated potential instigators. It is to be appreciated that any suitable technique for tagging potential problems and associated potential instigators in video streams can be employed.

Video historian component 304 can also include video storage component 408 that can store all or a subset of video streams received and/or obtained by video receiving component 402. In a non-limiting example, video storage component 408 can store all or a subset of video streams received and/or obtained by video receiving component 402. In another non-limiting example, video storage component 408 can select a subset of video streams received and/or obtained by video receiving component 402 to store, such as those video streams or portions of video streams associated with potential problems and/or associated potential instigators.

Video historian component 304 can also inform data identification component 206 of an identified potential problem. It is to be appreciated that video historian component can also inform data identification component of details of the identified problem, such as timing data, personnel data, machine data, process data, environment data, or any other data determined by video historian component 304 based on the video streams and data associated with cameras 210 that produced the video streams.

Figure 5:
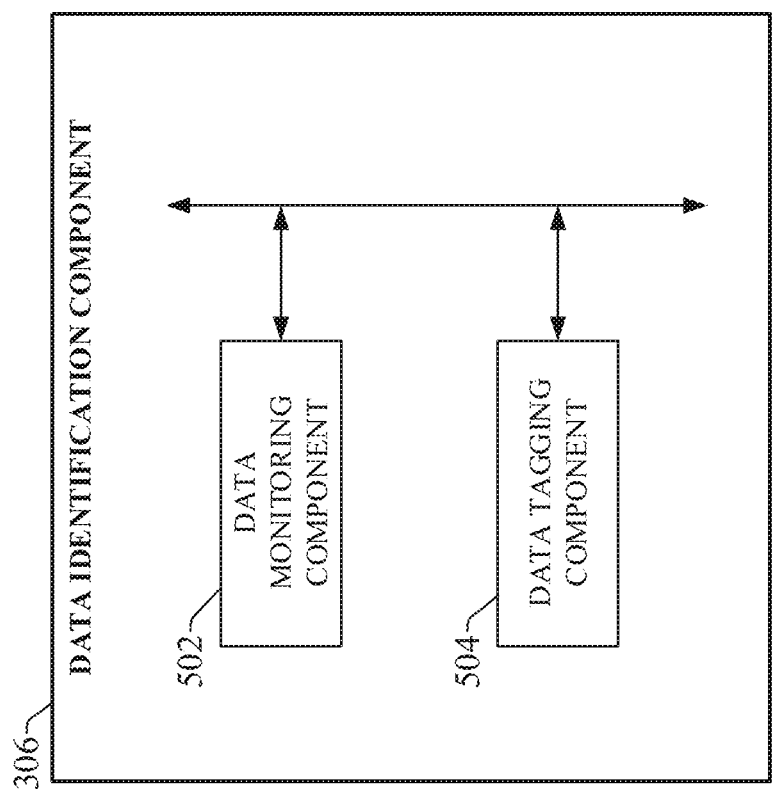
FIG. 5 illustrates an exemplary non-limiting block diagram of a data identification component in accordance with an implementation of this disclosure.

Referring to FIG. 5, data identification component 306 can include data monitoring component 502 that monitors data from databases 208 produced in the industrial environment to identify potential problems with industrial processes. It is to be appreciated that data in databases 208 can be substantially live data (e.g. real-time) or historical data. In a non-limiting example, data monitoring component 502 can monitor operational data associated with an industrial process and identify parameters in the data indicative of a potential problem with a state or operation of a machine, part, personnel, or environment associated with the industrial process. For example, data monitoring component 502 can determine that a parameter is outside of a normal range or does not meet a threshold value. Upon identification of a potential problem in that data, video monitoring component 404 can examine other data associated with activities in the industrial process that occurred concurrent and/or prior to the potential problem in order to identify possible instigators in the databases that could have played a part in causing the potential problem. It is to be appreciated that for an ongoing problem, concurrent can also mean other live data.

Referring to FIG. 7, in a non-limiting example, data monitoring component 502 can identify one or more parameters associated with machine 706g indicating a potential problem that machine 706g is producing parts out of tolerance. In another non-limiting example, data monitoring component 502 can identify one or more parameters associated with machine 706i indicating a potential problem that machine 706i has a motor that is not producing sufficient rotations per minute (rpm). In a further non-limiting example, data monitoring component 502 can identify one or more parameters associated with parts produced on the production line of conveyor 708 is not meeting quality thresholds. In an additional non-limiting example, data monitoring component 502 can analyze data associated with conveyor 708 and machines 706a, 706b, 706c, 706d, 706e, 706f, 706g, 706h, 706i, and 706j used in the industrial process concurrent and/or prior to a timestamp associated with the potential problem to identify data of potential instigators of the potential problem. For example, data monitoring component 502 can identify a parameter value at an earlier step in the process during processing at machine 706c as a potential instigator of the potential problem with the part at machine 706g.

Referring back to FIG. 5, data monitoring component 502 can also analyze data from databases 208 produced in the industrial environment to identify data produced in the industrial environment associated with potential problems identified by video historian component 304. For example, video historian component 304 can provide information (e.g. timing information, video recognition information, data associated with a camera the produce the video stream, etc.) regarding a potential problem identified in a video stream and/or associated potential instigators, and data monitoring component 502 can employ the information to identify and/or analyze data in databases 208 associated with the potential problem and/or associated potential instigators. In a non-limiting example, data monitoring component 502 can identify data that is time synchronized with the potential problem and/or associated potential instigators provided by video historian component 304. In another non-limiting example, data monitoring component 502 can analyze data in databases 208 to determine correlated data to the potential problem, and/or identify data of other potential instigators of the potential problem.

Referring back to FIG. 5, data identification component 306 can also include data tagging component 504 that can tag respective data associated with potential problems with respective unique identifiers associated with the potential problems. Data tagging component 504 can also tag respective potential instigators in the data associated with the potential problems with the respective unique identifiers associated with the potential problems. Data tagging component 504 can tag parameters and/or values of the parameters at a point in time or a range of time with the unique identifier associated with a potential problem. Tagging allows for easy retrieval and presentation of portions of related video streams with a potential problem and associated potential instigators, along with parameters and parameter values of a potential problem and associated potential instigators. It is to be appreciated that any suitable technique for tagging potential problems and associated potential instigators in video streams and data can be employed. Furthermore, the functionality of video tagging component 406 and data tagging component 504 can be combined into a tagging component.

Data identification component 306 can also inform video historian component 304 of an identified potential problem. Video historian component 204 can instruct video monitoring component 404 to analyze video streams to identify video streams produced in the industrial environment associated with potential problems identified by data identification component 306. For example, data identification component 306 can provide information (e.g. timing data, personnel data, machine data, process data, environment data, location data, etc.) regarding a potential problem identified in databases 208 and/or associated potential instigators, and video monitoring component 404 can employ the information to identify and/or analyze video streams associated with the potential problem and/or associated potential instigators. In a non-limiting example, video monitoring component 404 can identify video streams that are time synchronized with the potential problem and/or associated potential instigators provided by data identification component 306. In another non-limiting example, video monitoring component 404 can analyze video streams to determine correlated video streams to the potential problem, and/or identify video streams of other potential instigators of the potential problem.

It is also to be appreciated that while video monitoring component 404 and data monitoring component 502 are depicted as separate components, their functionality can be combined into a single monitoring component that allows for concurrent analysis of video streams produced by cameras 210 and data in databases 208 to identify potential problems and associated potential instigators.

Referring back to FIG. 3, recipient identification component 308 can determines recipients for presentation of video streams and/or data associated with potential problems and/or associated potential instigators. Recipient identification component 308 can examine information (e.g. timing information, video recognition information, data associated with a camera the produce the video stream, etc.) produced by video historian component 304 regarding a potential problem identified in a video stream and/or associated potential instigators, and information (e.g. timing data, personnel data, machine data, process data, environment data, location data, etc.) regarding a potential problem identified in databases 208 and/or associated potential instigators produced by data identification component 306 to determine appropriate recipients for video streams and/or data associated with potential problems and/or associated potential instigators. Recipient identification component 308 can select a recipient for the video streams and/or data associated with the potential problem and/or associated potential instigators, in a non-limiting example, based upon skillset of the recipient, organizational role of the recipient, recipient knowledge of the potential problem, recipient history with the potential problem, recipient location, recipient, recipient availability, recipient relationship with personnel involved in the potential problem, recipient maintenance history with machines involved in the potential problem, display devices associated with recipient, authorized security level of the recipient, physical proximity of the recipient to a location of the potential problem, and/or any other suitable criteria associated with the recipient).

In a non-limiting example, recipient identification component 308 can determine that a potential problem and/or associated potential instigators relate to a particular individual operating a machine. Recipient identification component 308 can identify that video streams and/or data associated with the potential problem and/or associated potential instigators should be presented to the individual's supervisor and/or an expert on operation of the machine. In another non-limiting example, recipient identification component 308 can determine that a potential problem and/or associated potential instigators are related to wear of a particular machine. Recipient identification component 308 can identify that video streams and/or data associated with the potential problem and/or associated potential instigators should be presented to a maintenance individual for the machine. In another non-limiting example, recipient identification component 308 can determine that a potential problem and/or associated potential instigators are related to a particular machine. Recipient identification component 308 can identify that video streams and/or data associated with the potential problem and/or associated potential instigators should be presented to an individual with the proper skillset to resolve the potential problem located closest to the machine that has access to a display device capable of presenting video streams. It is to be appreciated that an individual can also select recipients for video streams and/or data associated with the potential problem and/or associated potential instigators.

Referring to FIG. 7, in a non-limiting example, recipient identification component 308 can identify that a potential problem with machine 706i can be resolved by personnel 712i and designate personnel 712i as the recipient for video streams and/or data associated with the potential problem and/or associated potential instigators with machine 706i. In another non-limiting example, recipient identification component 308 can identify that the potential problem with machine 706i cannot be resolved by personnel 712i, but can be resolved by personnel 712c and designate personnel 712c as the recipient for video streams and/or data associated with the potential problem and/or associated potential instigators with machine 706i. In another non-limiting example, recipient identification component 308 can identify that the potential problem with machine 706i cannot be resolved by personnel 712i, but can be resolved by personnel 712c and a remotely located manager (not shown in FIG. 7), and designate personnel 712c and the manager as recipients for video streams and/or data associated with the potential problem and/or associated potential instigators with machine 706i. In a further non-limiting example, recipient identification component 308 can receive input from personnel 712i designating one or more recipients for video streams and/or data associated with the potential problem and/or associated potential instigators with machine 706i.

Figure 6:
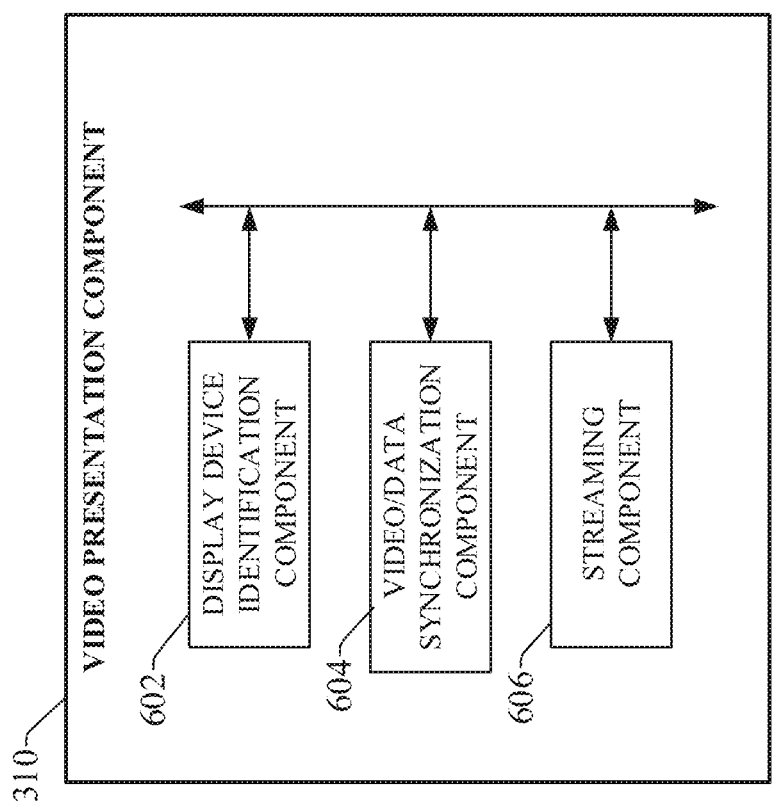
FIG. 6 illustrates an exemplary non-limiting block diagram of a video presentation component in accordance with an implementation of this disclosure.

Referring to FIG. 6, video presentation component 310 can include a display device identification component 602 that identifies one or more display devices 218 associated with identified recipients for video streams and/or data associated with the potential problem and/or associated potential instigators. Display device identification component 602 select display devices for the video streams and/or data associated with the potential problem and/or associated potential instigators, in a non-limiting example, based upon availability of display devices to a recipient, display capabilities of the display devices, location of the display devices, physical proximity of display devices to a recipient, wearable or non-wearable display device, type of display device, recipient preferences, or any other suitable criteria for selecting a display device for a recipient. It is to be appreciated that a recipient can provide input to select a display device for the video streams and/or data associated with the potential problem and/or associated potential instigators. It is also to be appreciated that more than one display device can be selected to concurrently present the video streams and/or data to a single recipient.

Video distribution system 202 can employ search capabilities and data organization as described in U.S. patent application Ser. No. 14/536,504, and employee tracking capabilities as described in U.S. patent application Ser. No. 14/657,129, both applications which are incorporated herein by reference in their entirety, for monitoring, analyzing, storing, and presenting video streams from cameras 210 and data in databases 208.

Video presentation component 310 can include a video/data synchronization component 604 that can synchronize video streams and/or data associated with the potential problem and/or associated potential instigators to a common time signal for presentation. For example, video streams and/or data that that were timestamped based upon distinct time signals can be synchronized by video/data synchronization component 604 to a common time signal based upon respective differences between the distinct time signals and the common time signal.

Video presentation component 310 also includes streaming component 606 that formats and streams a display of the video streams and/or data associated with the potential problem and/or associated potential instigators to the display device(s) associated with the recipient(s). Streaming component 606 can format the display, in a non-limiting example, based upon display device capabilities, recipient preferences, pre-defined templates, input provided by the recipient, the video streams and/or data being presented, authorized security level of the recipient, location of display device, wearable or non-wearable display device, type of display device, input devices associated with the display device, or any other suitable criteria for formatting video streams and/or data. Streaming component 606 can send data or commands that initiate an application to present the display on the display device(s) associated with the recipient(s). It is to be appreciated that the display can be configured on the fly by the recipient as the stream is being displayed to produce a customized display of the video streams and/or data. It is also to be appreciated that portions of the video streams and/or data may be redacted by the streaming component based upon authorized security level of the recipient. Furthermore, the video streams and/or data can be overlaid on a layered map as described in U.S. patent application Ser. No. 14/657,129, such as according to areas of the map to which the video streams and/or data are related.

It is to be appreciated that the stream of a display of the video streams and/or data associated with the potential problem and/or associated potential instigators can include streams of live video and live data.

Furthermore, video presentation component 310 can automatically generate a dashboard to present a display of the video streams and/or data associated with the potential problem and/or associated potential instigators to recipients at relevant times. In addition, video presentation component 310 can combine video streams and/or data associated with the potential problem and/or associated potential instigators to generate a virtual reality display that can be presented on a virtual reality display device.

Additionally, video presentation component 310 can create a training video presentations from video streams and/or data associated with the potential problem and/or associated potential instigators, optionally along with video streams and/or data collected during resolution of the potential problem that can be presented to personnel connection with training exercises associated with the potential problem.

Figure 8:
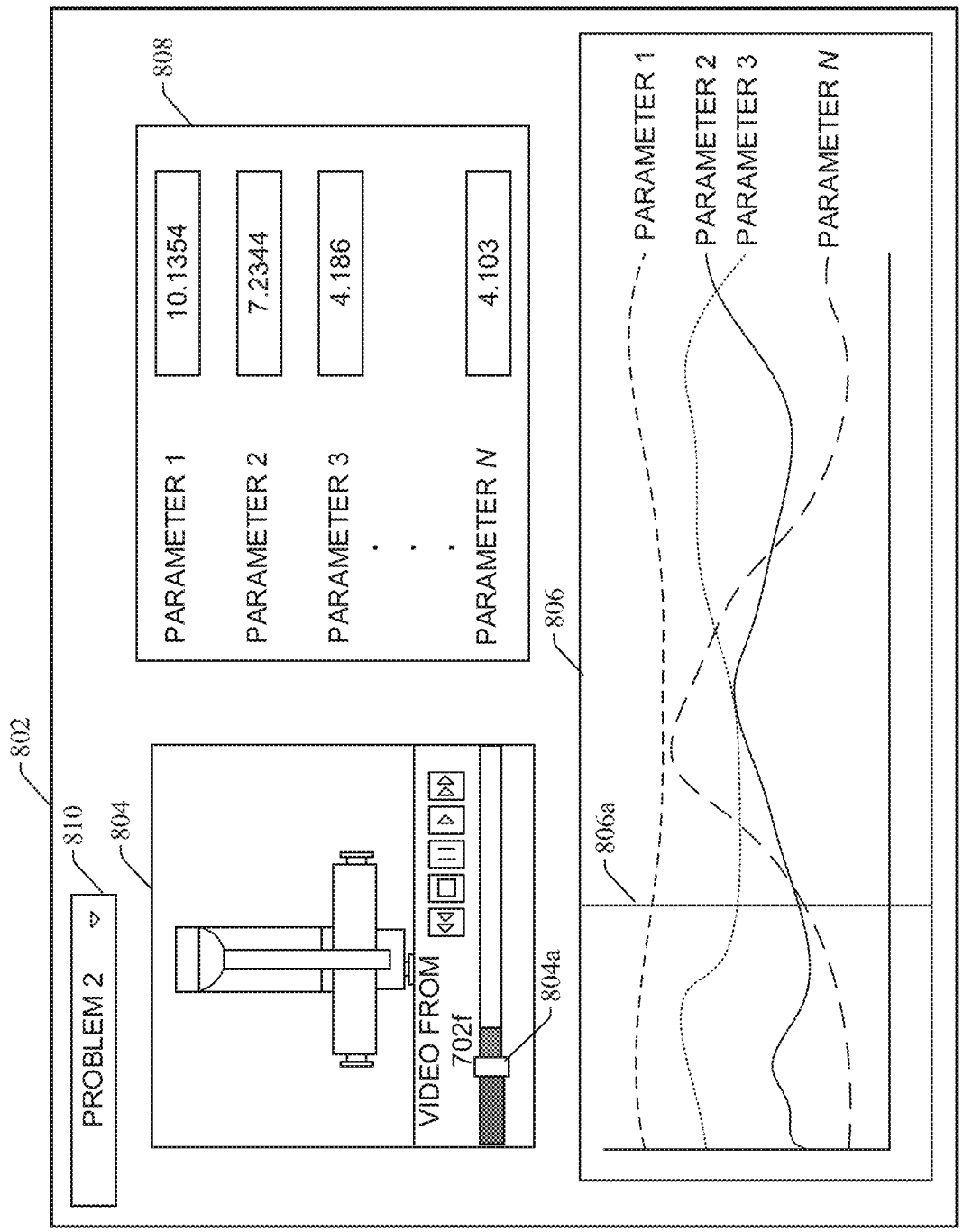
FIG. 8 illustrates a diagram of an exemplary non-limiting display of a video stream and data associated with a potential problem in accordance with an implementation of this disclosure.

Referring to FIG. 8, a non-limiting example display 802 is depicted of a video stream and data associated with a potential problem. Display 802 includes a drop-down menu 810 that enables selection of a potential problem to be presented in display 802. In this example, "PROBLEM 2" is selected. Display 802 also includes video player 804 which in presenting video stream from camera 702f associated with "PROBLEM 2". Video player 804 has a playback position indicator 804a which indicates position of playback of video stream from camera 702f. Display 802 also includes parameter presentation area 808 that displays parameters and their associated parameter values associated with "PROBLEM 2". In this example, parameter presentation area 808 includes PARAMETER 1, PARAMETER 2, PARAMETER 3, . . . PARAMETER N, where N is a positive integer indicating the number of parameters presented in parameter presentation area 808. It is to be appreciated that any number of parameters can be presented in parameter presentation area 808 with navigation controls (not shown), such as in a non-limiting example scrolling controls. The parameter values shown in parameter presentation area 808, in a non-limiting example, can correspond to the values of the parameters at the time position of playback position indicator 804a. Display 802 also includes graph 806 that displays lines showing the values of PARAMETER 1, PARAMETER 2, PARAMETER 3, . . . PARAMETER N over time. Graph 806 includes playback position indicator 806a which corresponds to the time position of playback position indicator 804a. In a non-limiting example, playback position indicator 806a, playback position indicator 804a, and parameter values shown in parameter presentation area 808 can maintain time synchronization as playback of video stream from camera 702f changes. In another non-limiting example, a recipient of display 802 can manipulate controls (not shown) on display 802 to display playback position indicator 806a, playback position indicator 804a, and parameter values shown in parameter presentation area 808 out of time synchronization. It is to be appreciated that display 802 can be customized on the fly by a recipient to display 802 by display configuration controls (not shown) to include more, less, or different display elements, video streams, and/or data in various formats.

Figure 9:
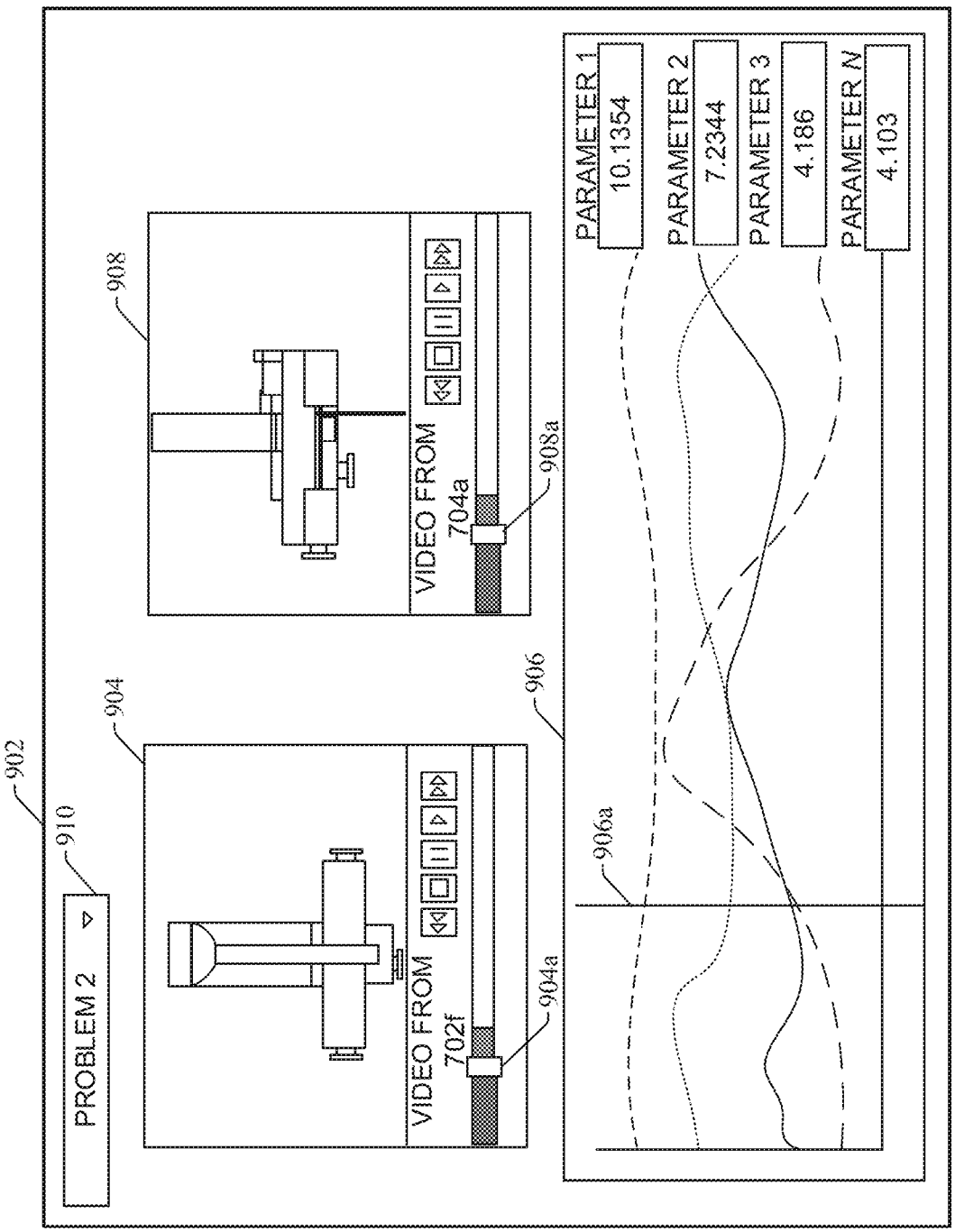
FIG. 9 illustrates a diagram of an exemplary non-limiting display of a video stream and data associated with a potential problem in accordance with an implementation of this disclosure.

Referring to FIG. 9, another non-limiting example display 902 is depicted of a video stream and data associated with a potential problem. Display 902 includes a drop-down menu 910 that enables selection of a potential problem to be presented in display 902. In this example, "PROBLEM 2" is selected. Display 902 also includes video player 904 which in presenting video stream from camera 702f associated with "PROBLEM 2". Video player 904 has a playback position indicator 904a which indicates position of playback of video stream from camera 702f. Display 902 also includes video player 908 which in presenting video stream from wearable device 704a associated with "PROBLEM 2". Video player 908 has a playback position indicator 908a which indicates position of playback of video stream from camera 702f. Display 902 also includes graph 906 that displays lines showing the values of PARAMETER 1, PARAMETER 2, PARAMETER 3, . . . PARAMETER N over time. Graph 906 includes playback position indicator 906a which corresponds to the time position of playback position indicator 904a. In a non-limiting example, playback position indicator 904a, playback position indicator 908a, and playback position indicator 906a can maintain time synchronization as playback of video stream from camera 702f changes. In another non-limiting example, a recipient of display 902 can manipulate controls (not shown) on display 902 to display playback position indicator 904a, playback position indicator 908a, and playback position indicator 906a out of time synchronization. It is to be appreciated that display 902 can be customized on the fly by a recipient to display 902 by display configuration controls (not shown) to include more, less, or different display elements, video streams, and/or data in various formats.

Figure 10:
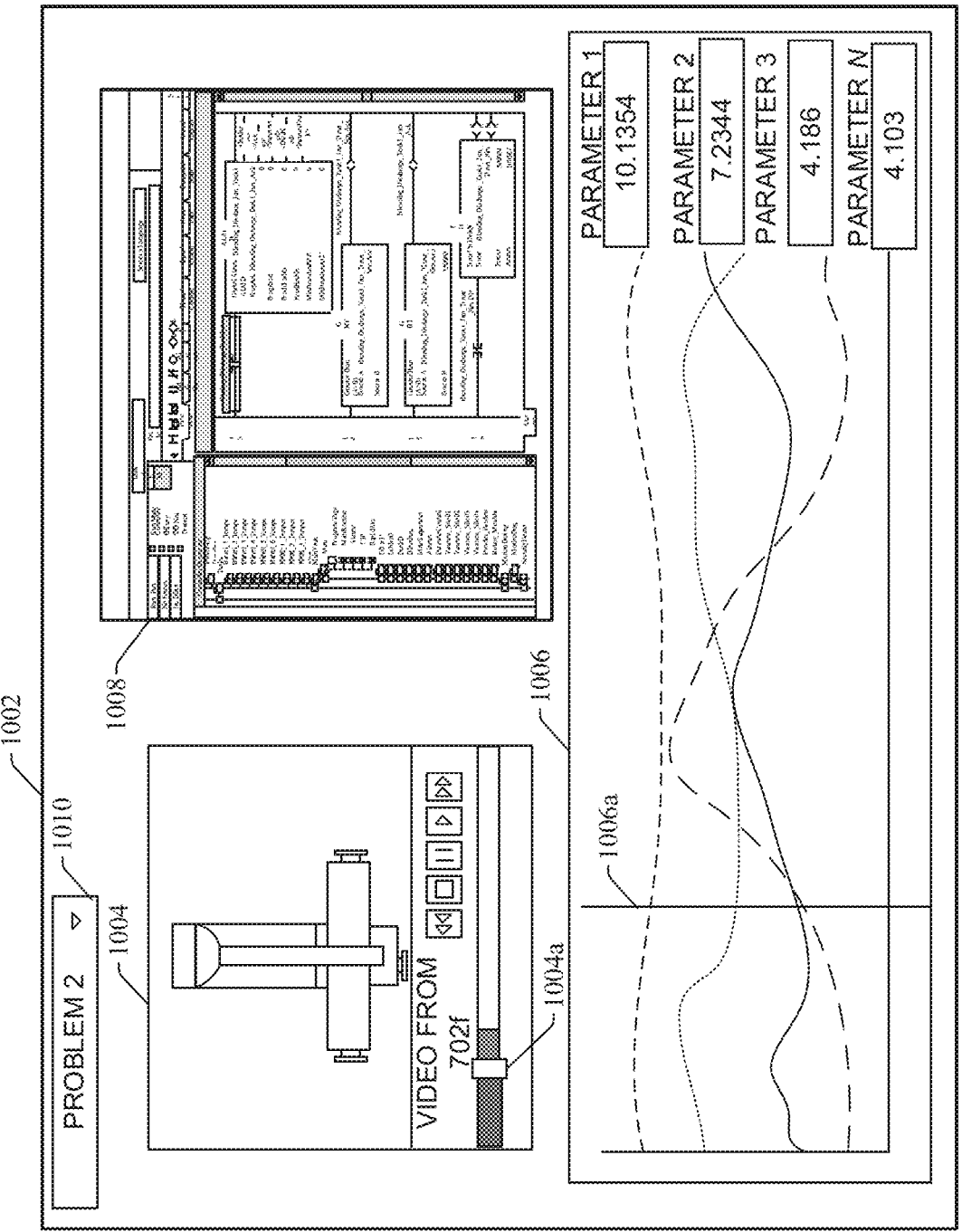
FIG. 10 illustrates a diagram of an exemplary non-limiting display of video streams and data associated with a potential problem in accordance with an implementation of this disclosure.

Referring to FIG. 10, another non-limiting example display 1002 is depicted of video streams and data associated with a potential problem. Display 1002 includes a drop-down menu 1010 that enables selection of a potential problem to be presented in display 1002. In this example, "PROBLEM 2" is selected. Display 1002 also includes video player 1004 which in presenting video stream from camera 702f associated with "PROBLEM 2". Video player 1004 has a playback position indicator 1004a which indicates position of playback of video stream from camera 702f. Display 1002 also includes control program presentation are 1008 that displays a control program associated with "PROBLEM 2". The section of control program shown in control program presentation are 1008, in a non-limiting example, can correspond to the section of control program executing at the time position of playback position indicator 1004a. Display 1002 also includes graph 1006 that displays lines showing the values of PARAMETER 1, PARAMETER 2, PARAMETER 3, . . . PARAMETER N over time. Graph 1006 includes playback position indicator 1006a which can correspond to the time position of playback position indicator 1004a. In a non-limiting example, playback position indicator 1004a, playback position indicator 1008a, and the section of control program shown in control program presentation area 1008 are in time synchronization as playback of video stream from camera 702f changes. In another non-limiting example, a recipient of display 1002 can manipulate controls (not shown) on display 1002 to display playback position indicator 1004a, playback position indicator 1008a, and the section of control program shown in control program presentation area 1008 out of time synchronization. It is to be appreciated that display 1002 can be customized on the fly by a recipient to display 1002 by display configuration controls (not shown) to include more, less, or different display elements, video streams, and/or data in various formats.

Referring back to FIG. 4, video historian component 304, can maintain a video log that comprises information for each potential problem identified, such a description of the potential problem, videos associated with the potential problem and/or potential instigators of the potential problem, information (e.g. identifiers, timestamps of delivery and/or views, confirmation of viewing, etc.) associated with recipient(s) and/or display device(s) to which video streams and/or data associated with the potential problem and/or associated potential instigators were presented, comments (e.g. textual, audio, image, and/or video) provided by recipients regarding the potential problem, associated potential instigators, and/or resolution of the potential problem, or any other suitable information related to the videos, potential problem, associated potential instigators, and/or resolution of the potential problem. Video historian component 304 can also employ the log to generate reports and statistics regarding potential problems, associated potential instigators, and/or resolutions of the potential problems.

Additionally, video presentation component 310 can include in a display all or a portion of the information in a video log associated with a potential problem when another similar potential problem is identified in the future. This can advantageously assist a recipient of the display in resolving the similar potential problem expeditiously.

Figure 11:
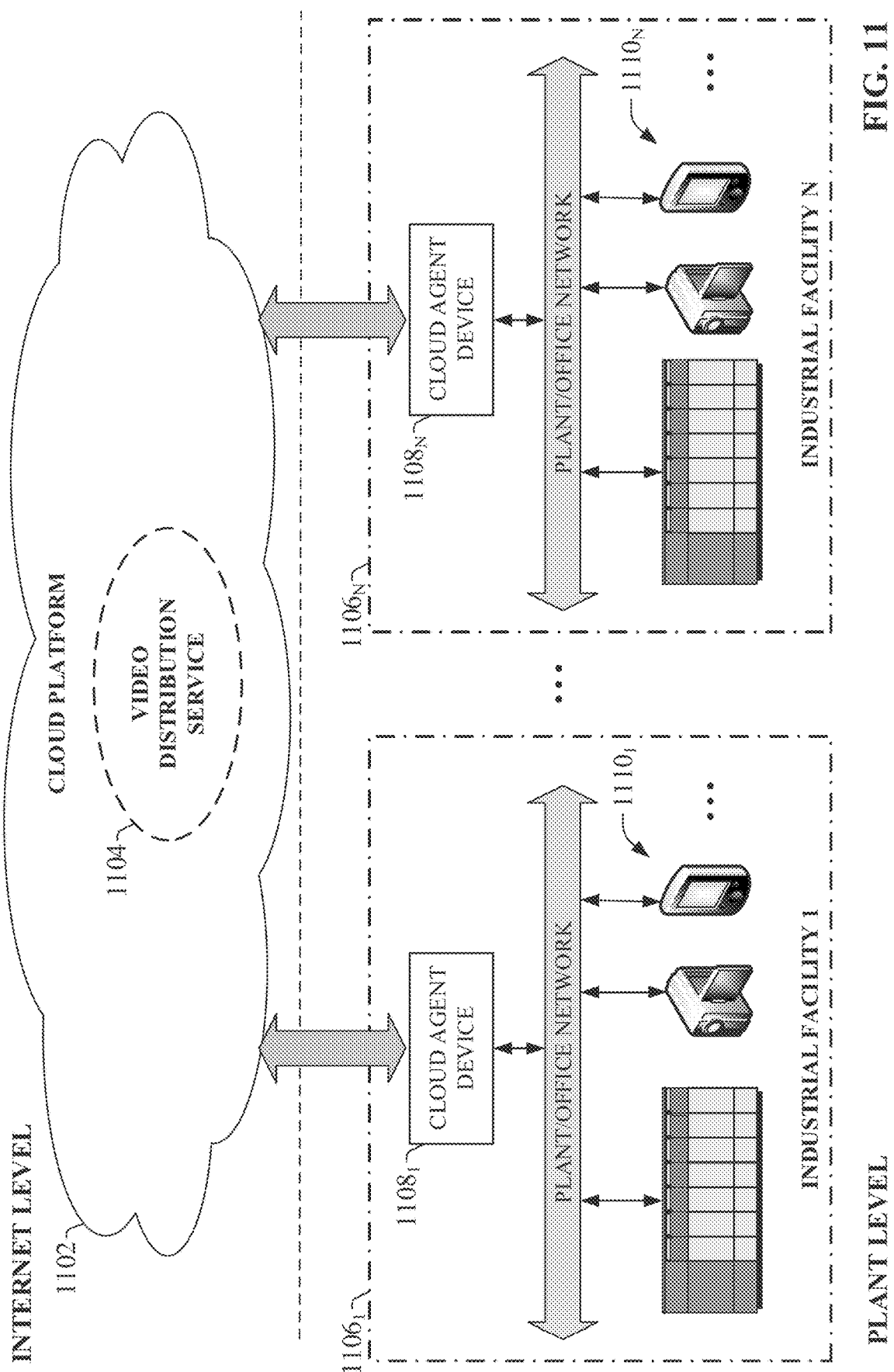
FIG. 11 illustrates a diagram of an exemplary non-limiting cloud-based implementation for the video distribution system in accordance with an implementation of this disclosure.

As noted above, one or more embodiments of the multi-platform industrial search system can be implemented on a cloud platform. FIG. 11 is a conceptual diagram of a generalized cloud-based implementation for the video distribution system described herein. In this implementation, the video distribution system 202 executes as a cloud-based video distribution service 1104 on cloud platform 1102, allowing video streams and data from multiple geographically diverse industrial facilities (e.g., industrial facilities 1106₁-1106ₙ) to be indexed under a common federated data model for collective searching as described in U.S. patent application Ser. No. 14/536,504. This cloud-based implementation also allows a user to access the video distribution service 1104 from substantially any location.

Cloud platform 1102 can be any infrastructure that allows video distribution service 1104 to be accessed and utilized by cloud-capable devices. Cloud platform 1102 can be a public cloud accessible via the Internet by devices having Internet connectivity and appropriate authorizations to utilize the video distribution service 1104. In some scenarios, cloud platform 1102 can be provided by a cloud provider as a platform-as-a-service (PaaS), and the video distribution service 1104 can reside and execute on the cloud platform 1102 as a cloud-based service. In some such configurations, access to the cloud platform 1102 and the video distribution service 1104 can be provided to customers as a subscription service by an owner of the video distribution service 1104. Alternatively, cloud platform 1102 can be a private or semi-private cloud operated internally by the enterprise, or a shared or corporate cloud environment. An example private cloud can comprise a set of servers hosting the video distribution service 1104 and residing on a corporate network protected by a firewall.

If cloud platform 1102 is a web-based cloud, cloud agent devices 1108 at the respective industrial facilities 1106 may interact with video distribution service 1104 directly or via the Internet. In an example configuration, the devices 1110 connect to the on-premise cloud agent devices 1108 through a physical or wireless local area network or radio link. In another example configuration, the industrial devices 1110 may access the cloud platform 1102 directly using integrated cloud agents.

Figure 12:
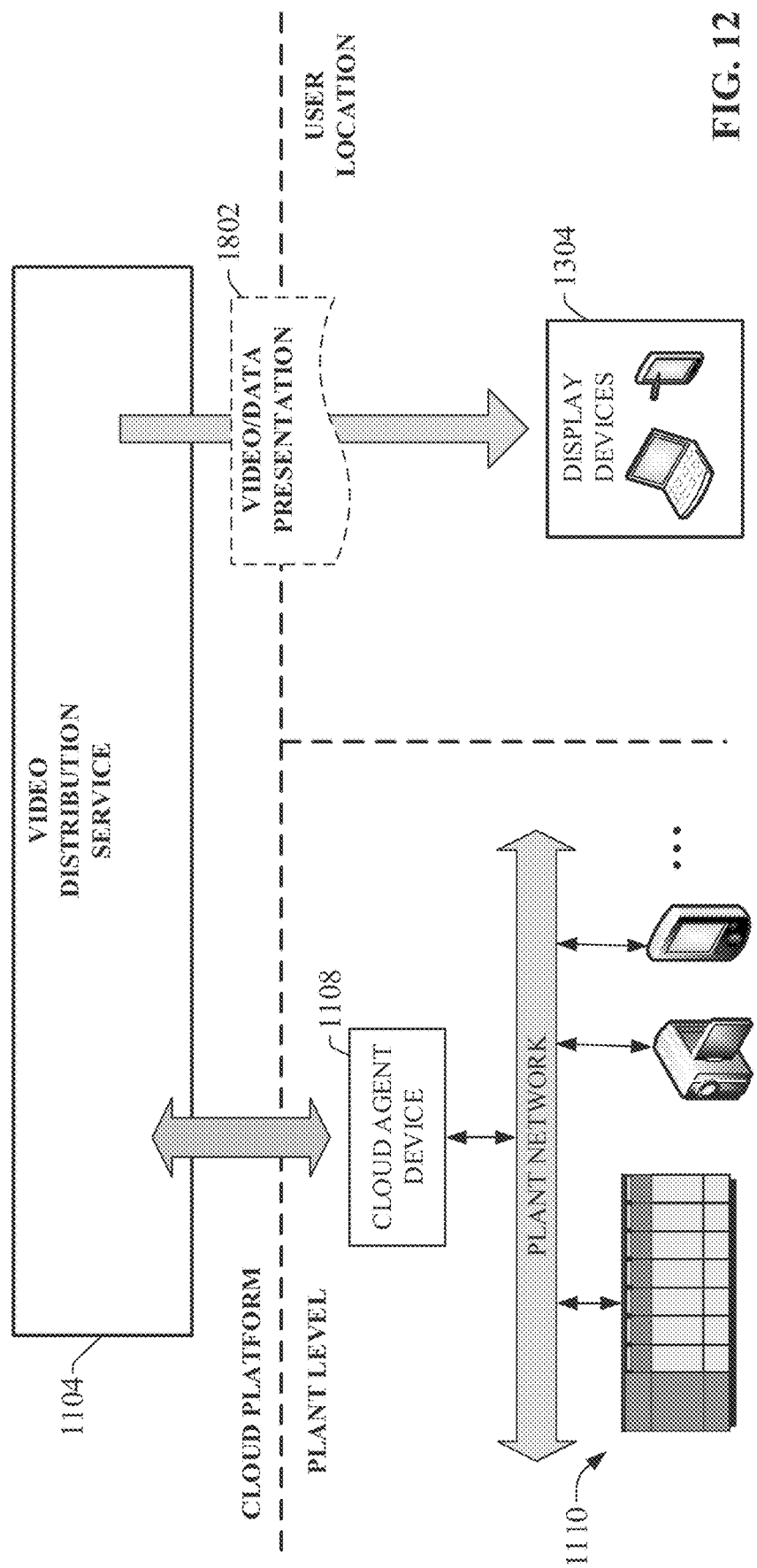
FIG. 12 illustrates a diagram of an exemplary non-limiting cloud-based video distribution service in accordance with an implementation of this disclosure.

FIG. 12 is a block diagram illustrating a cloud-based video distribution service in more detail. In this cloud-based implementation, the video distribution service 1104 may interface with the devices 1110 via cloud agent device 1108. In some embodiments, cloud agent device 1108 may serve as a gateway between cloud-based video distribution service 1104 and devices 1110 on the plant floor, allowing the video distribution service 1104 to obtain, analyze, correlate, and tag the video stream and data items using techniques similar to those described above.

Video historian component 304, data identification component 306, recipient identification component 308, and video presentation component 310 perform similar functions to those described above in connection with FIG. 3. In this cloud-based implementation, network interface component 312 exchanges data with authorized display devices 1304 via the cloud platform. This can include receiving requests from the display devices 1304 for access to the video distribution service 1104 and verifying that the display devices 1304 are authorized to access and use the video distribution service 1104 (e.g., using password verification, biometric verification, etc.). Authorized display devices 1304, which can be located either within or outside the plant facility, can submit search queries to and receive search results from the cloud-based video distribution service 1104. Moreover, streaming component 606 can present displays of video streams and/or data associated with the potential problem and/or associated potential instigators to the authorized display device 1304 at any location with access to the Internet (e.g., wired, wireless, cellular, etc.).

Figure 13:
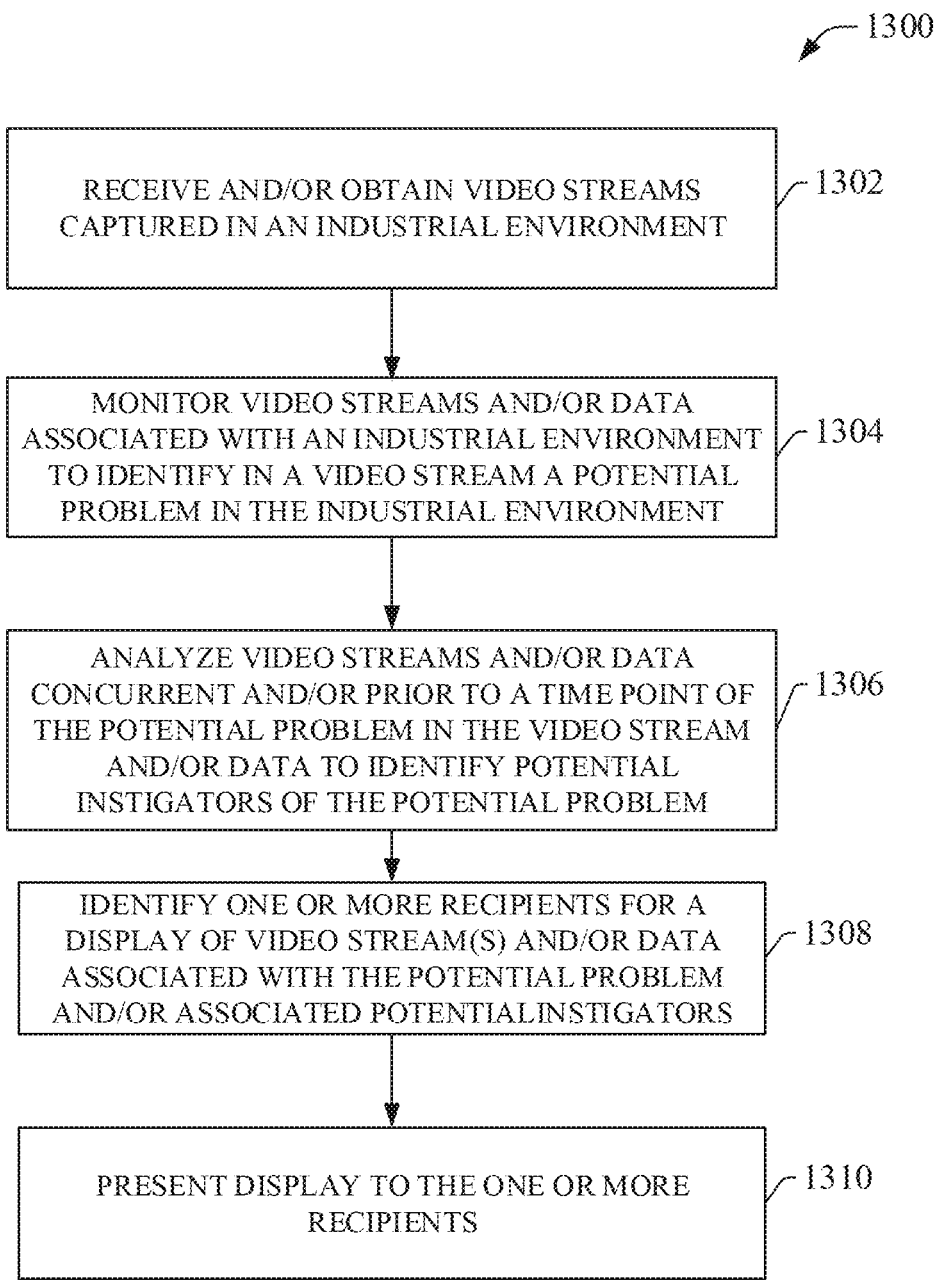
FIG. 13 illustrates an exemplary non-limiting flow diagram for identifying a potential problem in an industrial environment based on video streams and determining recipients to deliver video streams associated with the potential problem in accordance with an implementation of this disclosure.
Figure 14:
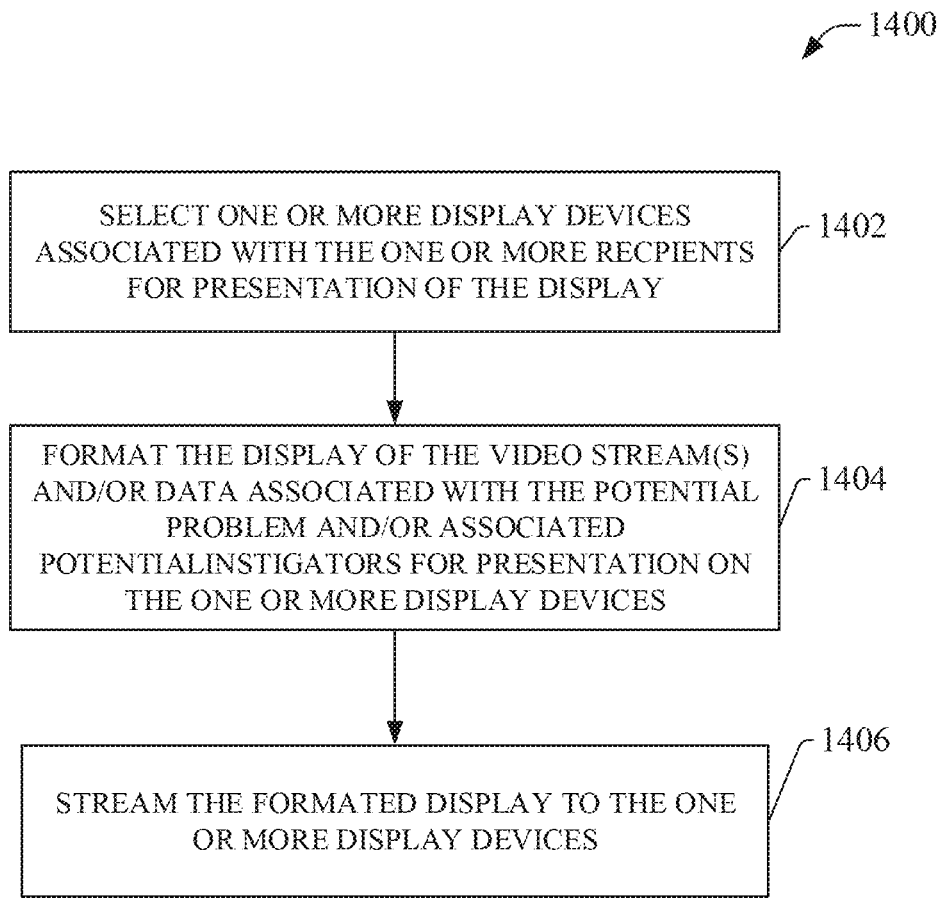
FIG. 14 illustrates an exemplary non-limiting flow diagram for selecting display devices associated with recipients to present a display in accordance with an implementation of this disclosure.

FIGS. 13-14 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13 illustrates an example methodology 1300 for identifying a potential problem in an industrial environment based on video streams and determining recipients to deliver video streams associated with the potential problem. At 1302, video streams captured by cameras in an industrial environment are received and/or obtained (e.g. by a video receiving component 402, a video historian component 304, and/or a video distribution system 202). At 1304, a video streams and/or data associated with an industrial environment are monitored to identify in a video stream a potential problem in the industrial environment (e.g. by a video monitoring component 404, a video historian component 304, a data monitoring component 502, a data identification component 306, and/or a video distribution system 202). At 1306, video streams and/or data concurrent and/or prior to a time point of the potential problem in the video stream are analyzed to identify potential instigators of the potential problem (e.g. by a video monitoring component 404, a video historian component 304, a data monitoring component 502, a data identification component 306, and/or a video distribution system 202). At 1308, one or more recipients for a display of video stream(s) and/or data associated with the potential problem and/or associated potential instigators are identified (e.g. by a recipient identification component 308, and/or a video distribution system 202). At 1310, a display is presented to the one or more recipients (e.g. by a display device identification component 602, a video/data synchronization component 604, a streaming component 606, a video presentation component 310, a video tagging component 406, a video storage component 408, a video historian component 304, a data tagging component 504, a data identification component 306, and/or a video distribution system 202).

FIG. 14 illustrates an example methodology 1400 for selecting display devices associated with recipients to present the display of FIG. 13. At 1402, one or more display devices associated with the one or more recipients of FIG. 13 are selected for presentation of the display (e.g. by a display device identification component 602, a video presentation component 310, and/or a video distribution system 202). At 1404, the display of the video stream(s) and/or data associated with the potential problem and/or the associated potential instigators is formatted respectively for presentation on the one or more display devices (e.g. by a video/data synchronization component 604, a streaming component 606, a video presentation component 310, and/or a video distribution system 202). At 1406, the formatted display is streamed to the one or more display devices (e.g. by a streaming component 606, a video presentation component 310, and/or a video distribution system 202).

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 15:
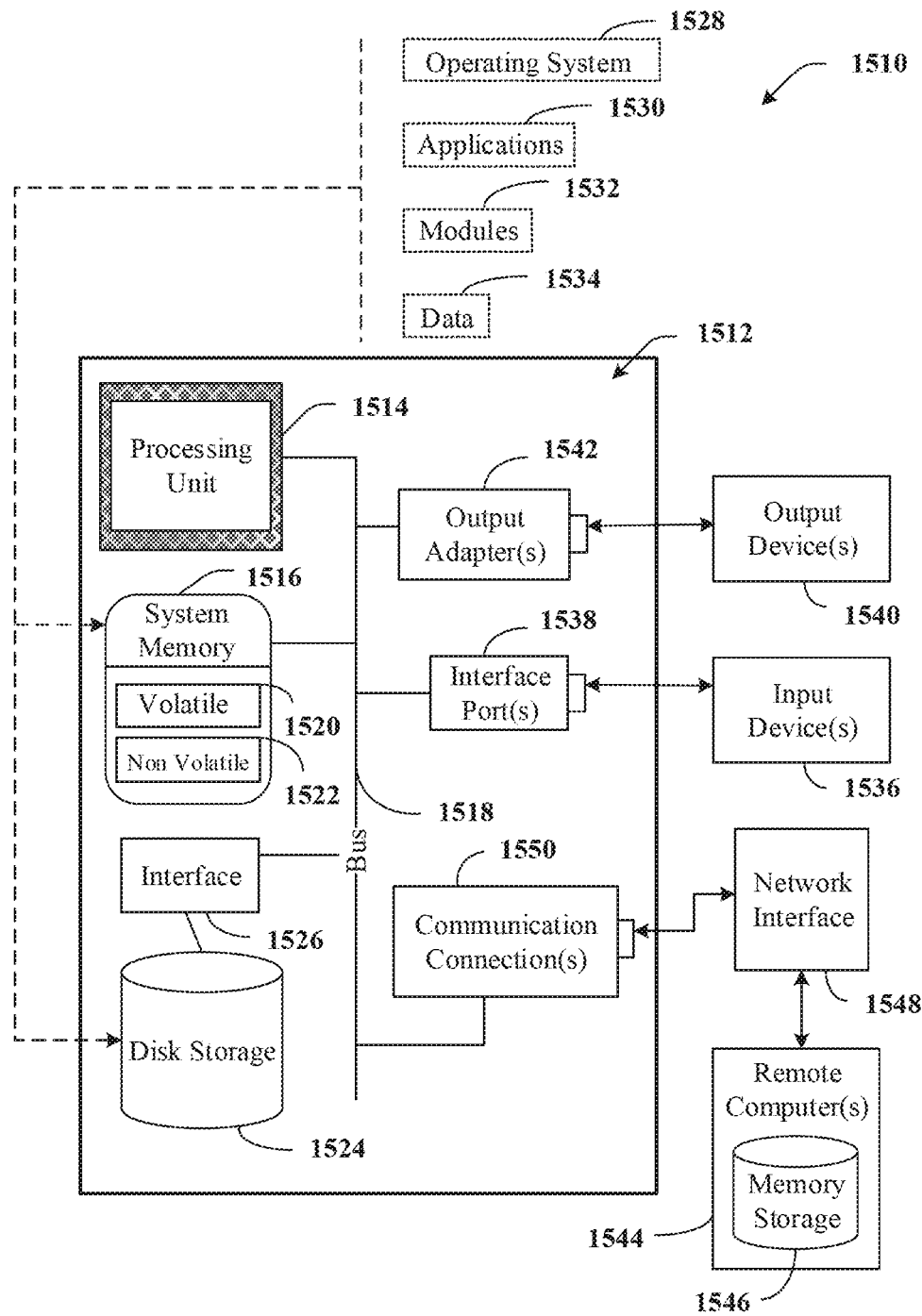
FIG. 15 is a block diagram representing an exemplary non-limiting computing system or operating environment in which the various embodiments can be implemented.
Figure 16:
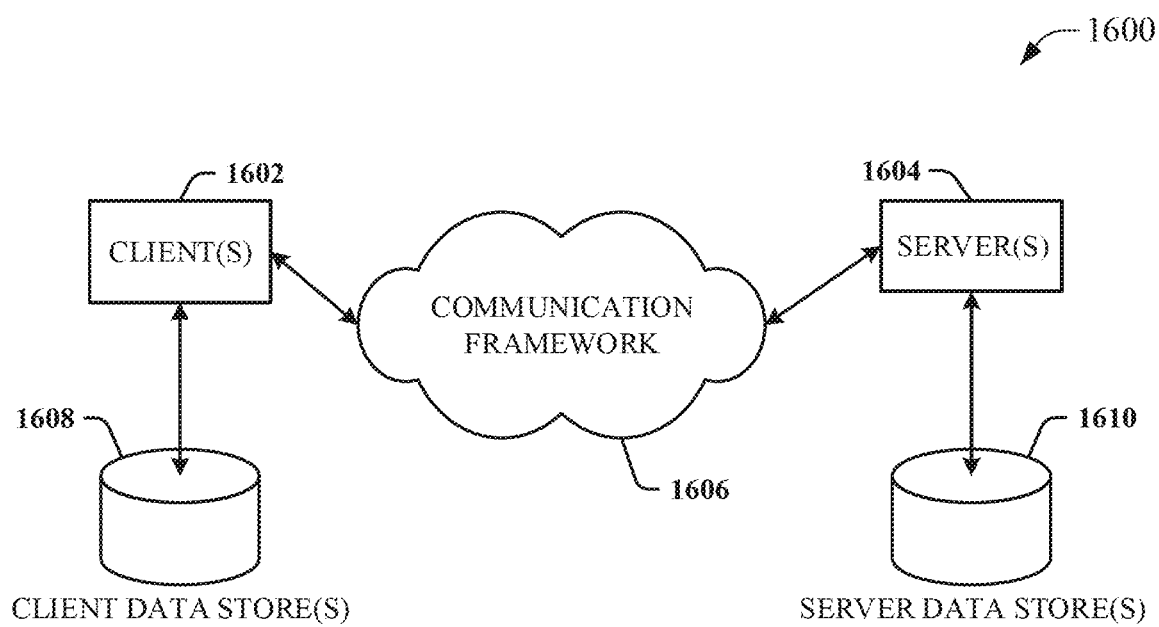
FIG. 16 is a block diagram representing an exemplary non-limiting networked environment in which the various embodiments can be implemented.

In order to provide a context for the various aspects of the disclosed subject matter, FIGS. 15 and 16 as well as the following discussion are intended to provide a brief, general description of a suitable environment in which the various aspects of the disclosed subject matter may be implemented.

With reference to FIG. 15, an example environment 1510 for implementing various aspects of the aforementioned subject matter includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Multi-core microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable PROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/non-removable, volatile/non-volatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer 1512. System applications 1530 take advantage of the management of resources by operating system 1528 through program modules 1532 and program data 1534 stored either in system memory 1516 or on disk storage 1524. It is to be appreciated that one or more embodiments of the subject disclosure can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapters 1542 are provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s)

1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1548 can also encompass near field communication (NFC) or Bluetooth communication.

Communication connection(s) 1550 refers to the hardware/software employed to connect the network interface 1548 to the system bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

FIG. 16 is a schematic block diagram of a sample computing environment 1600 with which the disclosed subject matter can interact. The sample computing environment 1600 includes one or more client(s) 1602. The client(s) 1602 can be hardware and/or software (e.g., threads, processes, computing devices). The sample computing environment 1600 also includes one or more server(s) 1604. The server(s) 1604 can also be hardware and/or software (e.g., threads, processes, computing devices). The servers 1604 can house threads to perform transformations by employing one or more embodiments as described herein, for example. One possible communication between a client 1602 and servers 1604 can be in the form of a data packet adapted to be transmitted between two or more computer processes. The sample computing environment 1600 includes a communication framework 1606 that can be employed to facilitate communications between the client(s) 1602 and the server(s) 1604. The client(s) 1602 are operably connected to one or more client data store(s) 1608 that can be employed to store information local to the client(s) 1602. Similarly, the server(s) 1604 are operably connected to one or more server data store(s) 1610 that can be employed to store information local to the servers 1604.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system, comprising:
   a processor; and
   a memory communicatively coupled to the processor, the memory having stored therein computer-executable instructions, comprising:
      a video historian component configured to:
         store video streams captured by cameras in an industrial environment, and
         learn a normal operating procedure for an industrial process in the industrial environment based on a first analysis of the video streams; and
      a data identification component configured to identify a deviation from the normal operating procedure based on a second analysis of a new video stream captured by a camera of the cameras in the industrial environment, the new video stream depicting execution of a current operating procedure being performed for the industrial process.

2. The system of claim 1, further comprising:
   a data recipient identification component configured to select a recipient for the new video stream from a plurality of recipients according to a selection criterion associated with the deviation; and
   a video presentation component configured to present a display comprising the new video stream to a display device associated with the recipient.

3. The system of claim 2, further comprising a data monitoring component configured to identify data produced in the industrial environment associated with the deviation, wherein the display further comprises the data.

4. The system of claim 3, wherein the data comprises potential instigator data indicating a possible cause of the deviation.

5. The system of claim 2, wherein
   the data identification component is further configured to identify at least one other video stream of the video streams that is indicative of a potential instigator of the deviation, and
   the display further comprises the at least one other video stream.

6. The system of claim 2, wherein the selection criterion comprises an ability of the recipient to resolve the deviation.

7. A method, comprising:
   accessing, by a system comprising a processor, video streams captured by cameras in an industrial environment;
   learning, by the system, a normal operating procedure for an industrial process in the industrial environment based on a first analysis of the video streams; and
   identifying, by the system, a deviation from the normal operating procedure based on a second analysis of a new video stream captured by a camera of the cameras in the industrial environment, the new video stream depicting execution of a current operating procedure being performed for the industrial process.

8. The method of claim 7, further comprising:
   selecting, by the system, a recipient for the new video stream from a plurality of recipients according to a selection criterion associated with the deviation; and
   presenting, by the system, a display comprising the new video stream to a display device associated with the recipient.

9. The method of claim 8, further comprising identifying, by the system, data produced in the industrial environment associated with the deviation; and
   wherein the display further comprises the data.

10. The method of claim 9, wherein the data comprises potential instigator data indicating a possible cause of the deviation.

11. The method of claim 8, further comprising identifying, by the system, at least one other video stream of the video streams that is indicative of a potential instigator of the deviation;
    wherein the display further comprises the at least one other video stream.

12. The method of claim 8, wherein the selection criterion comprises a determination that the recipient is capable of resolving the deviation.

13. A non-transitory computer-readable medium having stored thereon instructions that, in response to execution, cause a system comprising a processor to perform operations, the operations comprising:
    accessing video streams captured by cameras in an industrial environment;
    learning a normal operating procedure for an industrial process in the industrial environment based on a first analysis of the video streams; and
    identifying a deviation from the normal operating procedure based on a second analysis of a new video stream captured by a camera of the cameras in the industrial environment, wherein the new video stream records execution of a current operating procedure being performed for the industrial process.

14. The non-transitory computer-readable medium of claim 13, the operations further comprising selecting a recipient for the new video stream from a plurality of recipients according to a selection criterion associated with the deviation.

15. The non-transitory computer-readable medium of claim 14, the operations further comprising presenting a display comprising the new video stream to a display device associated with the recipient.

16. The non-transitory computer-readable medium of claim 15, the operations further comprising identifying data produced in the industrial environment associated with the deviation; and
    wherein the display further comprises the data.

17. The non-transitory computer-readable medium of claim 16, wherein the data comprises potential instigator data indicating a possible cause of the deviation.

18. The non-transitory computer-readable medium of claim 15, the operations further comprising identifying at least one other video stream of the video streams that is indicative of a potential instigator of the deviation; and
    wherein the display further comprises the at least one other video stream.

19. The system of claim 1, wherein the data identification component is configured to identify the deviation based on a comparison between a stored video stream depicting execution of the normal operating procedure for the industrial process and the new video stream depicting the execution of the current operating procedure being performed for the industrial process.

20. The method of claim 7, wherein the identifying the deviation comprises:
    comparing a stored video stream depicting execution of the normal operating procedure for the industrial process with the new video stream depicting the execution of the current operating procedure being performed for the industrial process; and identifying the deviation based on a result of the comparing.

* * * * *